(12) United States Patent
Ando et al.

(10) Patent No.: US 9,423,617 B2
(45) Date of Patent: Aug. 23, 2016

(54) HEAD-UP DISPLAY DEVICE

(71) Applicant: DENSO CORPORATION, Kariya, Aichi-pref. (JP)

(72) Inventors: Hiroshi Ando, Nagoya (JP); Takayuki Fujikawa, Nagoya (JP); Masayuki Yamaguchi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/766,069

(22) PCT Filed: Feb. 3, 2014

(86) PCT No.: PCT/JP2014/000554
§ 371 (c)(1),
(2) Date: Aug. 5, 2015

(87) PCT Pub. No.: WO2014/122913
PCT Pub. Date: Aug. 14, 2014

(65) Prior Publication Data
US 2016/0004075 A1 Jan. 7, 2016

(30) Foreign Application Priority Data

Feb. 6, 2013 (JP) .................................. 2013-021730
Sep. 20, 2013 (JP) .................................. 2013-195858

(51) Int. Cl.
*G02B 27/01* (2006.01)
*B60K 35/00* (2006.01)
(Continued)

(52) U.S. Cl.
CPC ............ *G02B 27/0101* (2013.01); *B60K 35/00* (2013.01); *B60R 1/001* (2013.01);
(Continued)

(58) Field of Classification Search
CPC .. G02B 5/021; G02B 5/1861; G02B 5/1842; G02B 26/10; G02B 26/101; G02B 26/105; G02B 26/123; G02B 2027/013; G02B 2027/0118; G02B 2027/0112; G02B 26/0833; G02B 27/01; G02B 27/0101; G02B 2027/0159; G02B 2027/0114; G02B 227/095; G02B 27/48; B60K 35/00; B60K 2350/2056; B60K 2350/2065
USPC ......... 359/199.1, 199.4, 200.8, 201.1–202.1, 359/204.1–205.1, 208.1, 211.1–211.2, 359/211.5, 563, 566, 618, 629–630, 741, 359/743; 353/30–32, 34; 349/11; 345/7–9; 348/115

See application file for complete search history.

(56) References Cited

U.S. PATENT DOCUMENTS

| 2007/0103747 A1 | 5/2007 | Powell et al. |
| 2009/0135374 A1 | 5/2009 | Horiuchi et al. |
| 2013/0050834 A1* | 2/2013 | Fujikawa ............ G02B 27/0101 359/630 |

FOREIGN PATENT DOCUMENTS

| JP | H07270711 A | 10/1995 |
| JP | 2007523369 A | 8/2007 |

(Continued)

OTHER PUBLICATIONS

International Search Report and Written Opinion (in Japanese with English Translation) for PCT/JP2014/000554, mailed Apr. 15, 2014; ISA/JP.

(Continued)

*Primary Examiner* — James Phan
(74) *Attorney, Agent, or Firm* — Harness, Dickey & Pierce, P.L.C.

(57) ABSTRACT

An HUD device includes a laser scanner that projects laser light carrying a display image, and a screen member that has a plurality of optical elements arrayed in the form of a grating, and diffuses laser light which emanates from the laser scanner and enters the optical elements toward a projection surface. The optical elements have curved surfaces, which take on a convexly curved form as a common curved form, formed as their faces, and diffuse laser light which is emitted to the projection surface from the curved surfaces. The optical elements are configured so that an element width differs in at least one array direction of the array of the grating between adjoining optical elements.

7 Claims, 25 Drawing Sheets

(51) Int. Cl.
G03B 21/20 (2006.01)
G03B 33/06 (2006.01)
H04N 9/31 (2006.01)
B60R 1/00 (2006.01)
G02B 5/18 (2006.01)
G02B 27/00 (2006.01)
G03B 21/14 (2006.01)
G06T 19/00 (2011.01)
G02B 5/02 (2006.01)
G02B 3/00 (2006.01)

(52) U.S. Cl.
CPC ......... *G02B 5/0278* (2013.01); *G02B 5/1842* (2013.01); *G02B 27/0037* (2013.01); *G03B 21/147* (2013.01); *G03B 21/2033* (2013.01); *G03B 33/06* (2013.01); *G06T 19/006* (2013.01); *H04N 9/31* (2013.01); *H04N 9/3129* (2013.01); *B60R 2300/205* (2013.01); *G02B 3/0043* (2013.01); *G02B 5/02* (2013.01); *G02B 2027/013* (2013.01); *G02B 2027/0118* (2013.01)

(56) References Cited

FOREIGN PATENT DOCUMENTS

| | | |
|---|---|---|
| JP | 2009128659 A | 6/2009 |
| JP | 2010145746 A | 7/2010 |
| JP | 2012163613 A | 8/2012 |

OTHER PUBLICATIONS

U.S. Appl. No. 14/766,029, filed Aug. 5, 2015, Fujikawa et al.

\* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2014/000554 filed on Feb. 3, 2014 and published in Japanese as WO 2014/122913 A1 on Aug. 14, 2014. This application is based on and claims the benefit of priority from Japanese Patent Applications No. 2013-021730 filed on Feb. 6, 2013 and No. 2013-195858 filed on Sep. 20, 2013. The entire disclosures of all of the above applications are incorporated herein by reference.

TECHNICAL FIELD

The present disclosure relates to a head-up display device that projects a display image onto a projection surface of a moving entity such as a vehicle, and thus displays a virtual image of the display image so that the virtual image can be discerned inside the moving entity.

BACKGROUND ART

Conventionally, a head-up display device (hereinafter, an HUD device) that realizes display of a virtual image of a display image by diffusing laser light, which carries the display image, using a screen member so as to introduce the laser light to a projection surface has been known.

For example, an HUD device disclosed in patent literature 1 diffuses laser light, which enters a screen member after being projected from a projector, using a plurality of optical elements which are arrayed in the form of a grating. The laser light thus diffused and projected onto a projection surface is discerned as a virtual image of a display image by a discerning person inside a moving entity.

PRIOR ART LITERATURE

Patent Literature

Patent literature 1: JP2009-128659 A

SUMMARY OF INVENTION

However, when laser light of high coherence enters a pattern of optical elements that have regularity owing to their grating-like array, and then diffuses, a variance occurs in luminance which a discerning person who discerns the laser light as a virtual image perceives.

The present disclosure is made in view of such an issue, and it is an object of the present disclosure to provide an HUD device capable of suppressing a luminance variance.

The present inventors have conducted profound studies on a screen member that diffuses laser light using optical elements and emits the laser light. As a result, the present inventors have gotten such findings that when laser light is emitted from a boundary between adjoining optical elements, emitted light exhibits an intensity distribution, which undulates depending on an emission angle, due to diffraction on the boundary, and a luminance variance is derived from the boundary diffraction.

According to a first aspect of the present disclosure devised based on the foregoing findings, a head-up display device projects a display image onto a projection surface of a moving entity and thus displays a virtual image of the display image so that the virtual image can be discerned inside the moving entity. The head-up display device includes a projector that projects laser light carrying the display image, and a screen member that has a plurality of optical elements arrayed in the form of a grating, and diffuses and introduces the laser light, which emanates from the projector and enters the optical elements toward the projection surface. The optical elements have curved surfaces, which are either convexly curved or concavely curved and take on a common curved form, formed as their faces, and diffuse the laser light which is emitted to the projection surface from the curved surfaces. The optical elements are formed so that an element width in an adjoining direction of the optical elements differs between the optical elements adjoining in at least one array direction in the array of the grating.

In the head-up display device according to the first aspect, since laser light rays emitted from boundaries among adjoining optical elements interfere with each other, the emitted light exhibits the intensity distribution, which undulates depending on the emission angle. Among the optical elements adjoining in at least one array direction of the array of the grating, the undulations in the intensity distributions are deviated from each other according to the difference in the element width. Accordingly, the light rays emitted from adjoining optical elements are discerned as a virtual image by a discerning person with the undulations in the intensity distributions deviated from each other. Therefore, an effect of suppression of a luminance variance which the discerning person perceives can be exerted.

Further, the present inventors have gotten such findings that when laser light rays emitted from the curved surfaces of the faces of the adjoining optical elements interfere with each other, diffracted light exhibiting an intensity distribution that has plural orders of diffraction peaks associated with emission angles is generated, and a luminance variance is derived from such multiple diffraction.

According to a second aspect of the present disclosure, in the head-up display device, the optical elements are configured so that a sag quantity from each of surface vertices of the curved surfaces to each of boundaries among the optical elements differs between the adjoining optical elements. According to the setting of the sag quantity differing between the adjoining optical elements, diffraction peaks of diffracted light induced by one optical element and an adjoining optical element on one side of the optical element are deviated from diffraction peaks of diffracted light induced by the one optical element and an adjoining optical element on the other side of the optical element. By utilizing the deviation effect, the diffraction peaks of diffracted light induced by one optical element and an adjoining optical element on one side of the optical element are superposed on diffraction valleys of diffracted light induced by the one optical element and an adjoining optical element on the other side of the optical element. Accordingly, a luminance variance which a discerning person who discerns the diffracted light rays as a virtual image can be suppressed. Herein, the diffraction valley refers to a valley between diffraction peaks in the intensity distribution of diffracted light.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Embodiments of the present disclosure will be described below in conjunction with the drawings. The same reference signs will be assigned to corresponding components of the embodiments, whereby an iterative description may be omitted. If part of the components of each of the embodiments is described, the other components could be understood by applying the components of any other embodiment described previously. Aside from an explicitly presented combination of components in a description of any of the embodiments, parts of components of embodiments may be combined even if the combination is not explicitly mentioned as long as the combination poses no problem.

Figure 1:
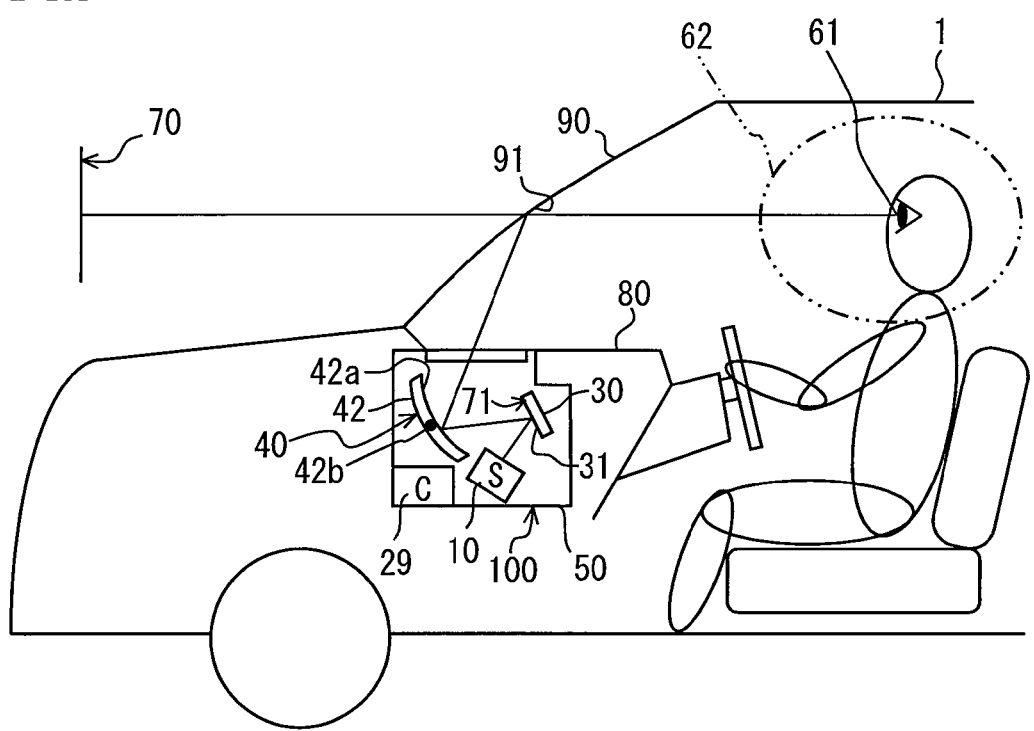
FIG. 1 is a schematic diagram showing a state of an HUD device according to a first embodiment mounted in a vehicle.

As shown in FIG. 1, an HUD device 100 in accordance with the first embodiment of the present disclosure is mounted in a vehicle 1 that is a moving entity, and stowed in an instrumental panel 80. The HUD device 100 projects a display image 71 onto a windshield 90 of the vehicle 1 which serves as a display member. Herein, in the vehicle 1, the surface of the windshield 90 on an interior side is formed as a projection surface 91, onto which the display image 71 is projected, in a curved concave state or a flat planar state. In the vehicle 1, the windshield 90 may have an angle difference, which is intended to suppress an optical path difference, between its interior-side surface and exterior-side surface. Otherwise, the interior-side surface of the windshield 90 may be provided with a deposition sheet or film in order to suppress the optical path difference.

In the vehicle 1 in which the display image 71 is projected onto the projection surface 91, a luminous flux of the image 71 reflected from the projection surface 91 reaches an eye point 61 of a discerning person inside the vehicle. The discerning person perceives the luminous flux that has reached the eye point 61, and thus discerns a virtual image 70 of the display image 71 formed ahead of the windshield 90. Discernment of the virtual image 70 is enabled when the eye point 61 is located in a discernment area 60 of the discerning person shown in FIG. 2.

Figure 3:
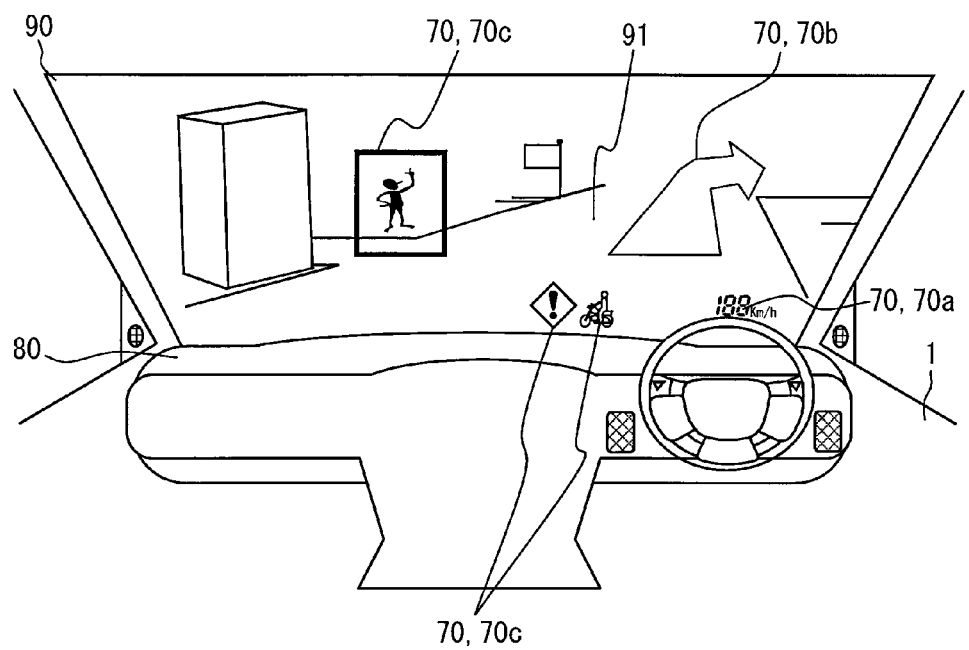
FIG. 3 is a front view showing a displaying state of the HUD device according to the first embodiment.

By projecting the display image 71 onto the projection surface 91, the HUD device 100 displays, as shown in FIG. 3, the virtual image 70 of the display image 71 so that the virtual image 70 can be discerned inside the vehicle 1. As the virtual image 70, an instructive display 70a representing a traveling speed of the vehicle 1, an instructive display 70b representing an advancing direction of the vehicle 1 provided by a navigation system, or a warning display 70c concerning the vehicle 1 is displayed.

(Overall Features of HUD Device)

The overall features of the HUD device 100 will be described below. As shown in FIG. 1, the HUD device 100 has a laser scanner 10, a controller 29, a screen member 30, and an optical system 40 incorporated in a housing 50.

Figure 4:
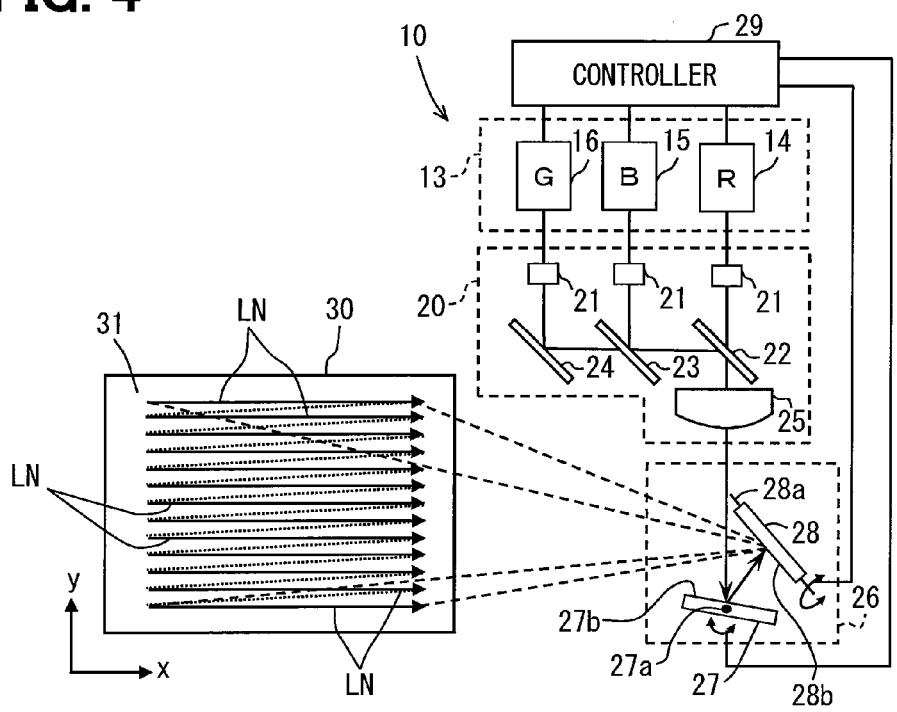
FIG. 4 is a schematic diagram showing a concrete configuration of the HUD device according to the first embodiment.

As shown in FIG. 4, the laser scanner 10 serving as a projector includes a light source unit 13, a light guide unit 20, and microelectromechanical systems (MEMS) 26.

The light source unit 13 includes three laser projection parts 14, 15, and 16. The laser projection parts 14, 15, and 16 project single-wavelength laser light rays of mutually different hues in response to a control signal sent from the controller 29 to which the laser projection parts are electrically connected. Specifically, the laser projection part 14 projects, for example, red laser light whose peak wavelength falls within a range from 600 nm to 650 nm (preferably, 640 nm). The laser projection part 15 projects, for example, blue laser light whose peak wavelength falls within a range from 430 nm to 470 nm (preferably, 450 nm). The laser projection part 16 projects, for example, green laser light whose peak wavelength falls within a range from 490 nm to 530 nm (preferably, 515nm). The laser light rays of three colors projected from the laser projection parts 14, 15, and 16 respectively are added up and mixed, whereby various colors can be reproduced.

The light guide unit 20 includes three collimator lenses 21, dichroic filters 22, 23, and 24, and a condenser lens 25. The collimator lenses 21 are disposed at a distance of, for example, 0.5 mm from the associated laser projection parts 14, 15, and 16 respectively on the laser light projection sides of the laser projection parts. The collimator lenses 21 refract laser light rays emanating from the associated laser projection parts 14, 15, and 16 respectively, and thus collimate the laser light rays into parallel light rays.

The dichroic filters 22, 23, and 24 are disposed at a distance of, for example, 4 mm from the associated collimator lenses 21 on the projection sides of the laser projection parts 14, 15, and 16 respectively. The dichroic filters 22, 23, and 24 reflect laser light rays of a specific wavelength out of the laser light rays having transmitted by the associated collimator lenses 21, and transmit laser light rays of the other wavelengths. More particularly, the dichroic filter 22 disposed on the projection side of the laser projection part 14 transmits red laser light and reflects laser light rays of the other colors. The dichroic filter 23 disposed on the projection side of the laser projection part 15 reflects blue laser light and transmits laser light rays of the other colors. The dichroic filter 24 disposed on the projection side of the laser projection part 16 reflects green laser light and transmits laser light rays of the other colors.

On the green laser light reflection side of the dichroic filter 24, the dichroic filter 23 is disposed at a distance of, for example, 6 mm. On the blue laser light reflection side and green laser light transmission side of the dichroic filter 23, the dichroic filter 22 is disposed at a distance of, for example, 6 mm. Further, on the red laser light transmission side and blue laser light and green laser light reflection side of the dichroic filter 22, the condenser lens 25 is disposed at a distance of, for example, 4 mm. Owing to the layout, red laser light transmitted by the dichroic filter 22 and blue laser light and green laser light reflected from the dichroic filer 22 after reflected from the dichroic filters 23 and 24 respectively are mixed when being fed to the condenser lens 25.

The condenser lens 25 is a plano-convex lens having a planar incidence surface and convex emission surface. The condenser lens 25 concentrates laser light incident on the incidence surface through refraction. As a result, the laser light transmitted by the condenser lens 25 is emitted to the MEMS 26.

The MEMS 26 include a horizontal scanning mirror 27, vertical scanning mirror 28, and drive parts (not shown) for the scanning mirror 27 and 28 respectively. On a surface of the horizontal scanning mirror 27 whose center is opposed to the condenser lens 25 at a distance of, for example, 5 mm, a thin film-like reflection surface 27b is formed through metal deposition or the like of aluminum. On a surface of the vertical scanning mirror 28 whose center is opposed to the horizontal scanning mirror 27 at a distance of, for example, 1 mm, a thin film-like reflection surface 28b is formed through metal deposition or the like of aluminum. The drive parts included in the MEMS 26 drive the respective scanning mirrors 27 and 28 in response to a control signal sent from the controller 29 to which the MEMS are electrically connected so that the respective scanning mirrors can be turned about axes of rotation 27a and 28a respectively.

The center of the vertical scanning mirror 28 serving as the last stage of the laser scanner 10 is disposed at a distance of, for example, 100 mm from the scanning surface 31 of the screen member 30. Owing to the layout, laser light rays sequentially entering the scanning mirrors 27 and 28 after emanating from the condenser lens 25 are sequentially reflected from the reflection surfaces 27b and 28b, and then projected onto the scanning surface 31.

Figure 2:
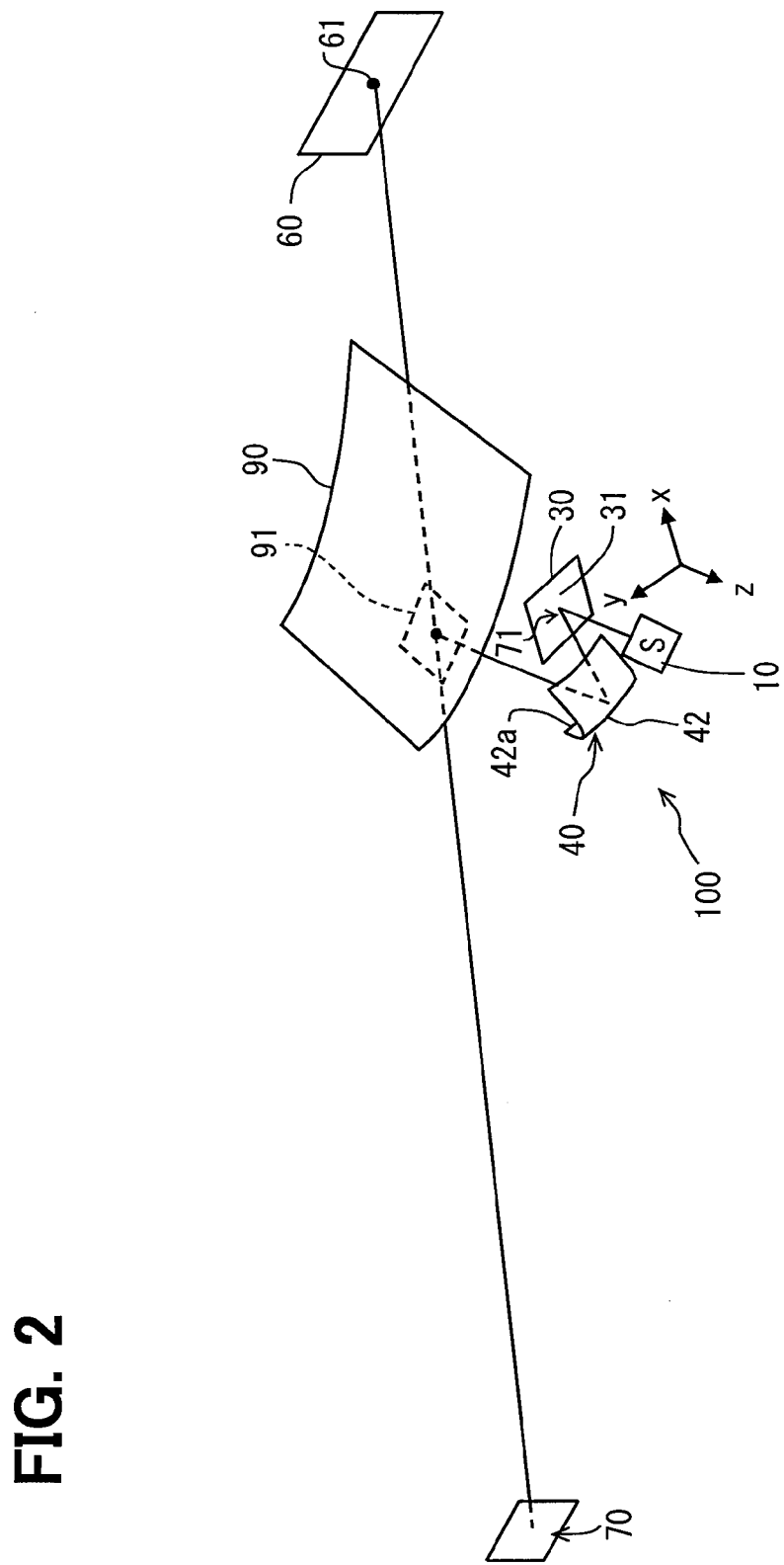
FIG. 2 is a perspective diagram showing an outline configuration of the HUD device according to the first embodiment.
Figure 5:
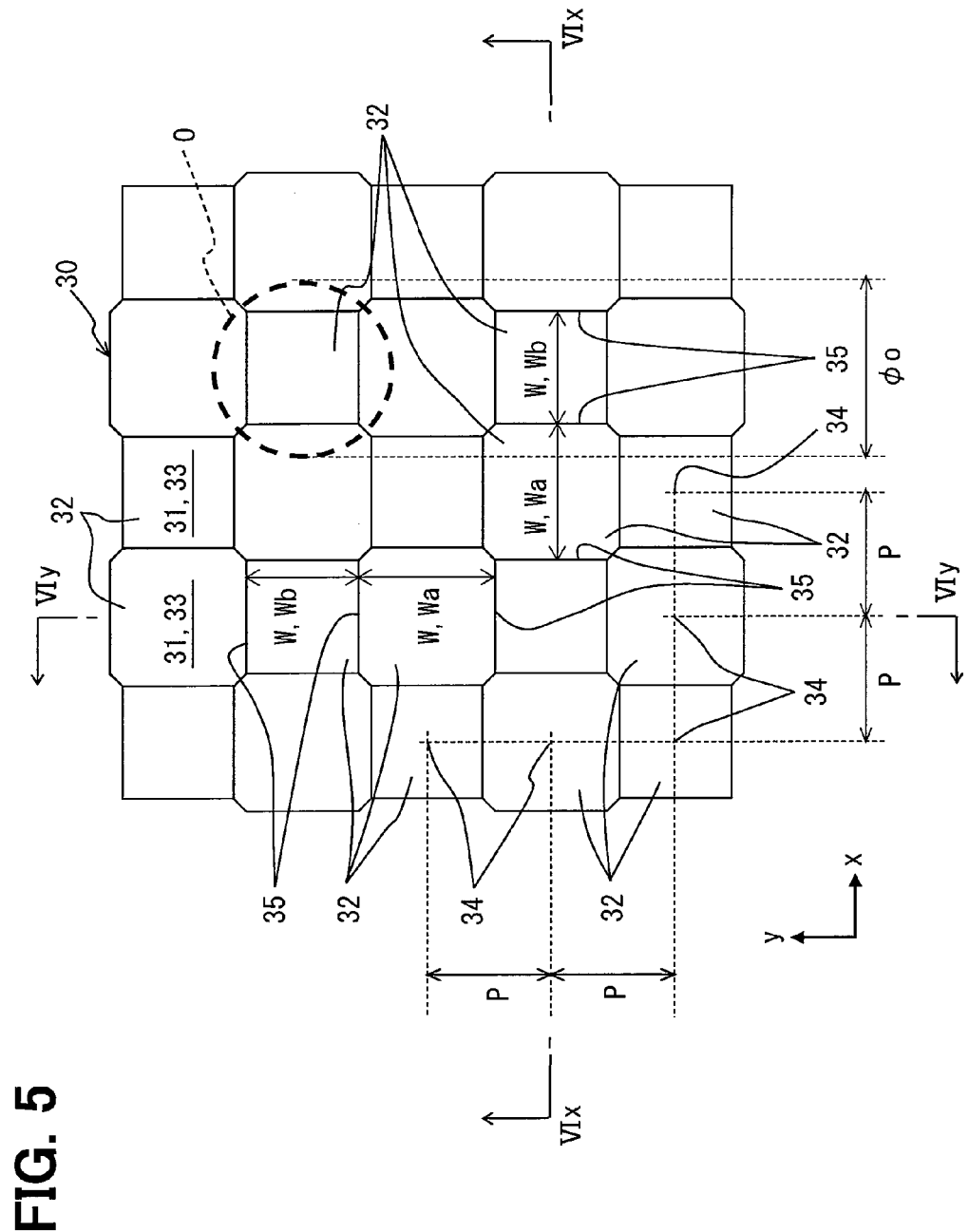
FIG. 5 is a plan view partly showing a screen member according to the first embodiment.

The controller 29 is a control circuit including a processor and others. The controller 29 outputs a control signal to the laser projection parts 14, 15, and 16, whereby laser light is intermittently pulsated and projected. In addition, the controller 29 outputs a control signal to the drive parts of the scanning mirrors 27 and 28 respectively, whereby a projecting direction of laser light to be projected onto the scanning surface 31 is changed into arrow directions in FIG. 4 along a plurality of scanning lines LN. Owing to this control, an area O onto which laser light is, as shown in FIG. 5, projected in the form of a circular spot is shifted on the scanning surface 31. Thus, the display image 71 is rendered. Specifically, laser light to be projected from the laser scanner 10 sweeps the scanning surface 31 in a horizontal direction x and vertical direction y to provide the display image 71. Herein, the display image 71 is, for example, formed on the scanning surface 31 as an image, which has 480 pixels in the horizontal direction x and 240 pixels in the vertical direction y, at 60 frames per sec. As shown in FIG. 2, the horizontal direction x of the scanning surface 31 is consistent with the horizontal direction of the vehicle 1. The vertical direction y of the scanning surface 31 may be tilted, as shown in FIG. 2, with respect to the vertical direction of the vehicle 1 or may be consistent with the vertical direction.

Figure 6:
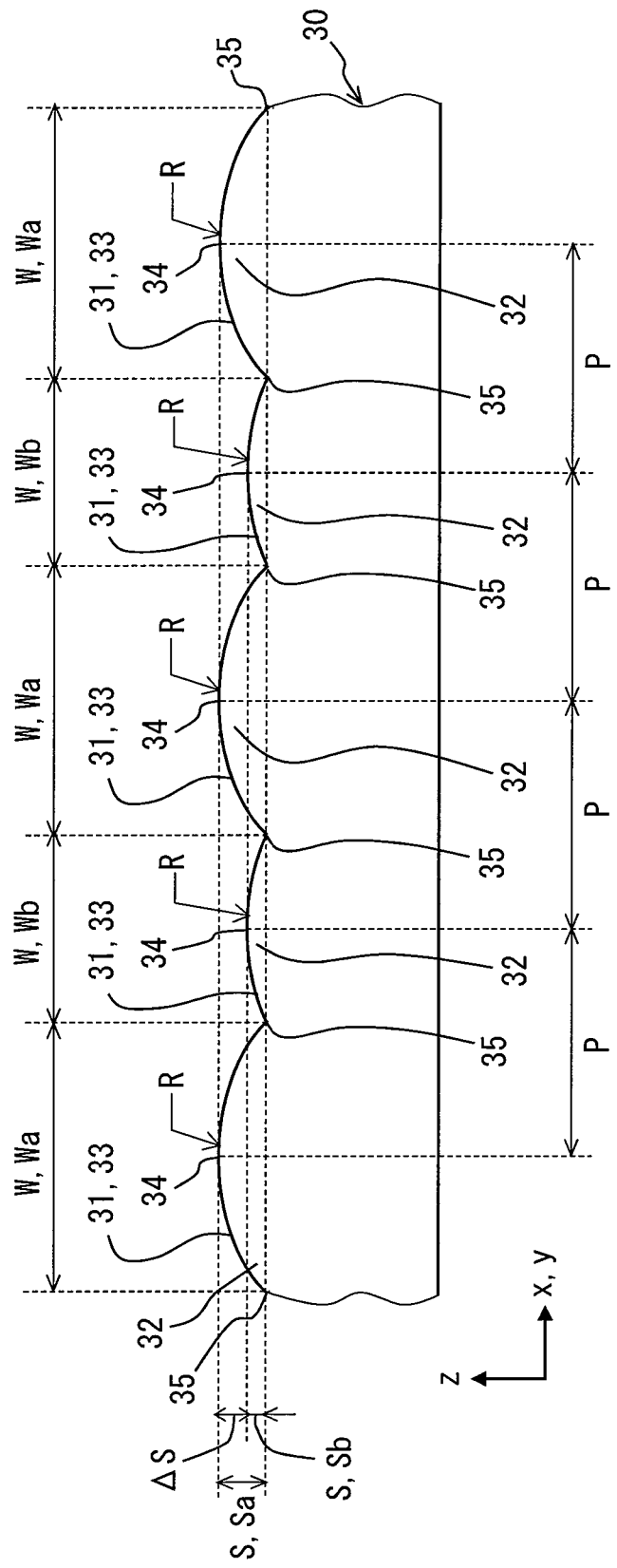
FIG. 6 is a schematic diagram partly showing the screen member according to the first embodiment and showing a section along a VIx-VIx line or VIy-VIy line in FIG. 5.

As shown in FIGS. 5 and 6, the reflective screen member 30 is formed by depositing aluminum on the surface of a resin substrate or glass substrate. The screen member 30 is disposed above the laser scanner 10 in the vehicle 1 (see FIGS. 1 and 2). The screen member 30 has a plurality of optical elements 32, which serve as micro-mirrors, arrayed in a horizontal direction x and vertical direction y in the form of a grating. The scanning surface 31 is formed with the faces of the optical elements 32 (more particularly, curved surfaces 33 to be described later). The faces of the optical elements 32 reflect laser light projected onto the scanning surface 31 so as to diffuse and emit the laser light. As shown in FIG. 5, the diameter φo of the projection area O on the scanning surface 31 onto which laser light is projected is set to a half-value width or more of an element width W of the optical elements 32 (preferably, a small element width Wb to be described later). The optical elements 32 may be, as shown in FIG. 6, formed as an united object or may be formed mutually separately and retained in a common substrate.

As shown in FIGS. 1 and 2, the optical system 40 includes a concave mirror 42 and a drive part for the concave mirror (not shown). The concave mirror 42 is formed by depositing aluminum on the surface of a resin substrate or glass substrate. The concave mirror 42 reflects laser light, which is diffused by the scanning surface 31, from a reflection surface 42a, and thus introduces the laser light into the projection surface 91 so as to project the display image 71. The reflection surface 42a is formed to be smoothly curved as a concave surface whose center is dented in a direction receding from the scanning surface 31 and projection surface 91, whereby the reflection surface 42a can enlarge and project the display image 71.

The drive part of the optical system 40 drives the concave mirror 42 in response to a control signal sent from the controller 29, to which the drive part is electrically connected, so that the concave mirror 42 can sway about an axis of sway 42b shown in FIG. 1. Owing to the sway, the discernment area 60 moves up and down along with the ups and downs of the position of image formation of the virtual image 70 of the projected display image 71. The position of the discernment area 60 is defined in consideration of an eyeellipse 62. What is referred to as the eyeellipse 62 is a spatial area inside the vehicle 1 in which the eye point 61 can exist on the assumption that an arbitrary discerning person is seated on a driver seat. The discernment area 60 that moves up and down along with the sway of the concave mirror 42 is supposed to at least partly enter the eyeellipse 62 within the range of the sway.

As for the optical system 40, any optical element other than the concave mirror 42 may be substituted for the concave mirror 42 or may be additionally included. Alternatively, the optical system 40 (concave mirror 42) may be excluded, and laser light diffused by the optical elements 32 may be directly projected onto the projection surface 91.

(Detailed Feature of Optical Elements)

Next, the detailed feature of the optical elements 32 employed in the first embodiment will be described below.

As shown in FIGS. 5 and 6, the faces of the optical elements 32 take on as a common curved form a convexly curved form to be convexly curved, and thus form curved surfaces 33 such as arc surfaces. The curved surfaces 33 of the faces of the optical elements 32 jut out to be opposed to the laser scanner 10 and optical system 40 in a direction z (see also FIG. 2) orthogonal to the directions x and y, and have the highest jutting points as surface vertices 34. The curved surfaces 33 of the faces of the optical elements 32 are formed on the scanning surface 31 of the screen member 30 on a side of the screen member 30, on which the screen member 30 is opposed to the laser scanner 10 and optical system 40, out of both the sides of the screen member 30 in a thickness direction (namely, direction z). Owing to the structure, laser light projected from the laser scanner 10 onto the scanning surface 31 is reflected from the curved surfaces 33 of the faces of the optical elements 32, and thus diffused and emitted from the curved surfaces 33 toward the optical system 40.

The optical elements 32 adjoining in each of the directions x and y have margins (contours) of their curved surfaces 33 layered one another, whereby boundaries 35 are formed among the optical elements 32. As for the curved surface 33 of the face of each of the optical elements 32, a depth, that is, a gap quantity from each of the surface vertices 34, which serve as a reference in the direction z, to each of the boundaries (inflection point on a longitudinal section) 35 is defined as a sag quantity S. In FIG. 5, for a better understanding, only part of reference sings is shown.

The present inventors have conducted profound studies on such a screen member 30 that diffuses laser light using the optical elements 32 and emits the laser light. As a result, the present inventors have gotten such findings that when laser light is emitted from the boundary 35 between adjoining optical elements 32, the emitted light exhibits an intensity distribution, which undulates depending on an emission angle, due to diffraction on the boundary 35, and a luminance variance is derived from the boundary diffraction (aperture diffraction).

Figure 7:
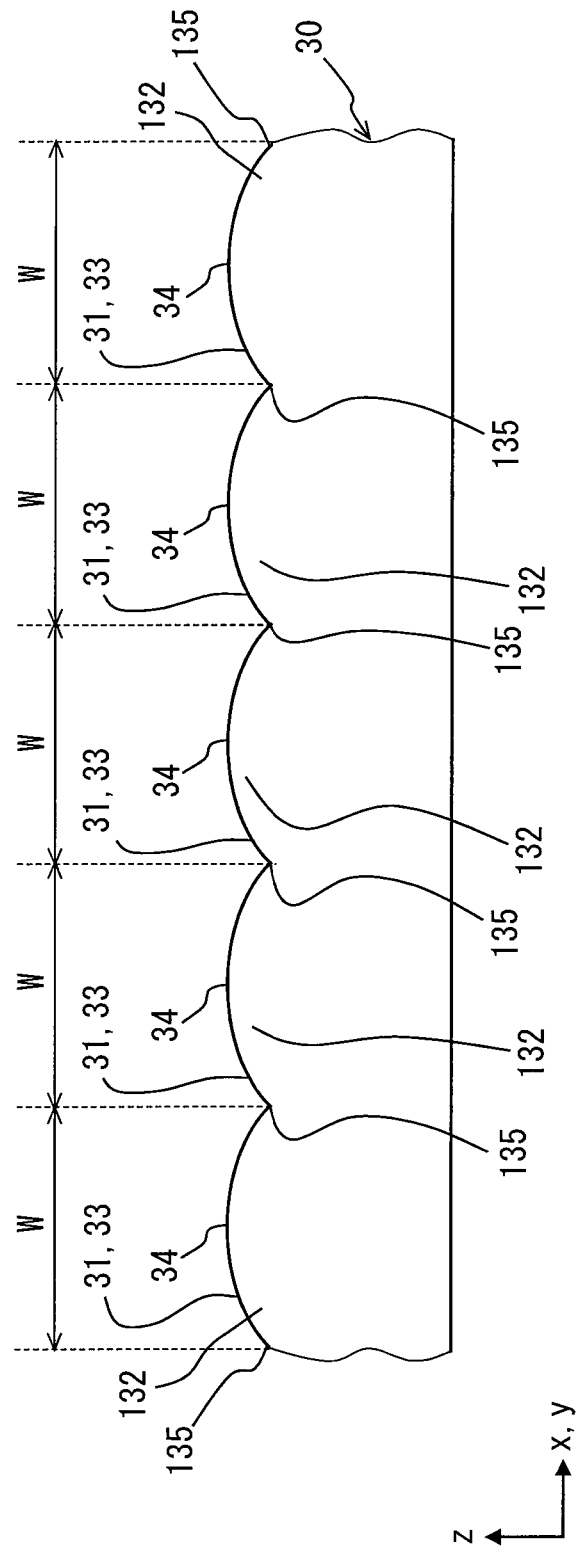
FIG. 7 is a schematic diagram partly showing a screen member in a comparative example and being equivalent to FIG. 6.
Figure 8:
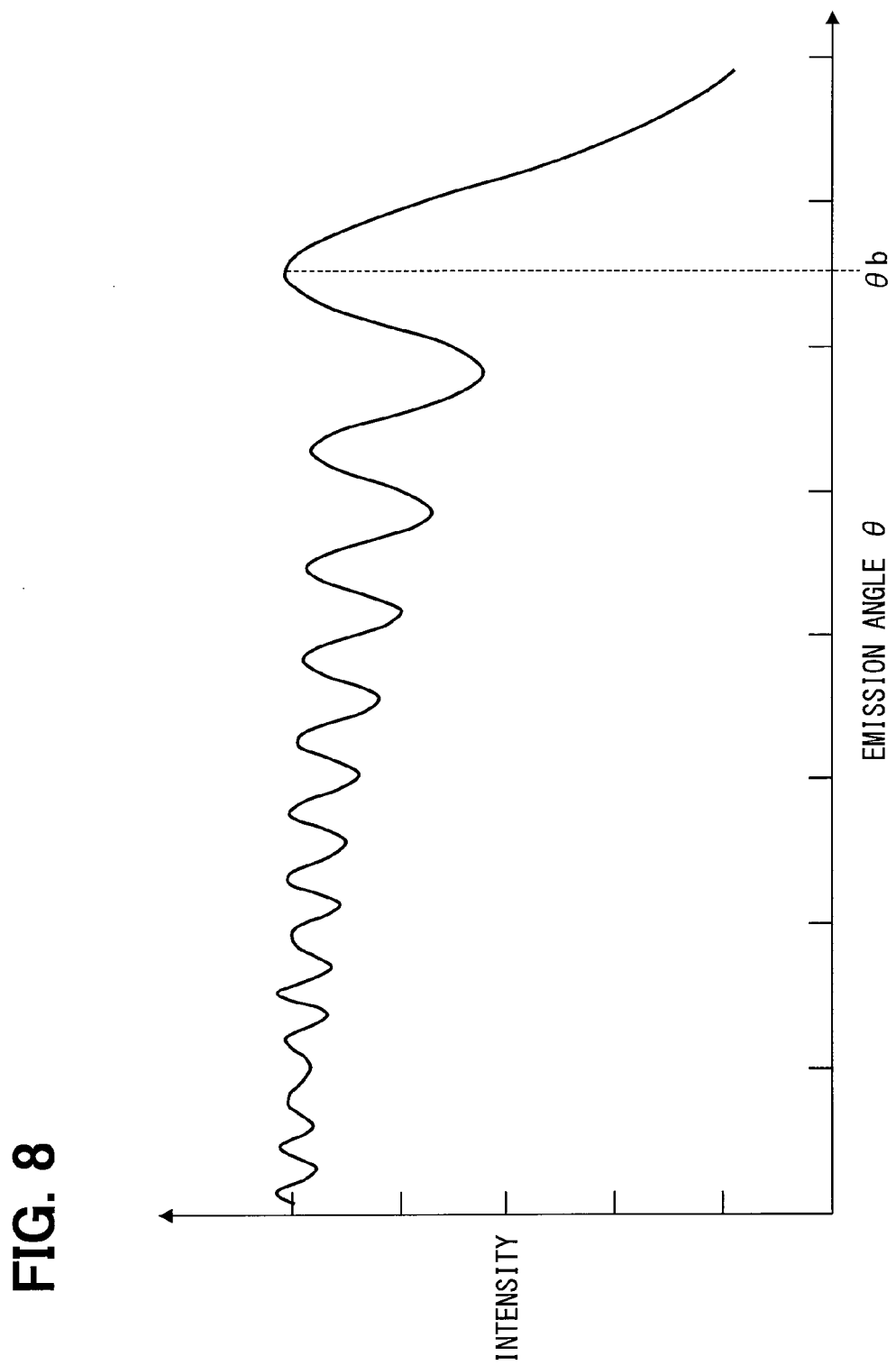
FIG. 8 is a schematic diagram for explaining superposition of emitted light rays on each other in the comparative example.

More particularly, in a comparative example having a structure conformable to the structure of the HUD device in patent literature 1, as shown in FIG. 7, optical elements 132 are formed so that the element width W is equal in any of the directions x and y between the adjoining optical elements 132. In the comparative example, as shown in FIG. 8, undulations of the intensity distribution depending on the emission angles θ from the optical elements 132 (in the comparative example, θ as a reflection angle) superposed with each other, and thus the peak intensity is increased. For this reason, in the intensity distribution in which the emission angles A are overlapped, the undulation quantity at the emission angle θb corresponding to the boundary 135 (see FIG. 7) is increased. As a result, a discerning person who discerns the diffracted light rays as the virtual image 70 perceives a luminance variance depending on the amount of undulations.

In the first embodiment, as shown in FIGS. 5 and 6, the optical elements 32 are formed so that an element width W between boundaries 35 on a longitudinal section, which contains the surface vertices 34, differs between adjoining optical elements 32 in both of directions x and y over the entire scanning surface 31. That is, the optical elements 32 are formed so that one optical element 32 has the element width W in one array direction x of the array of the grating differing from that of the optical element 32 adjoining in the direction x, and has the element width W in the other array direction y of the array of the grating differing from that of the optical element 32 adjoining in the direction y. As the element width W in the first embodiment, two large and small element widths Wa and Wb are designated. Optical elements 32 having the large element width Wa and optical elements 32 having the small element width Wb are alternately arrayed in both of the directions x and y. Owing to the arrayed form, the optical elements have the same relationship in the value of the element width W in comparison with an adjoining optical element 32 in both of the horizontal direction x and vertical direction y.

Figure 9:
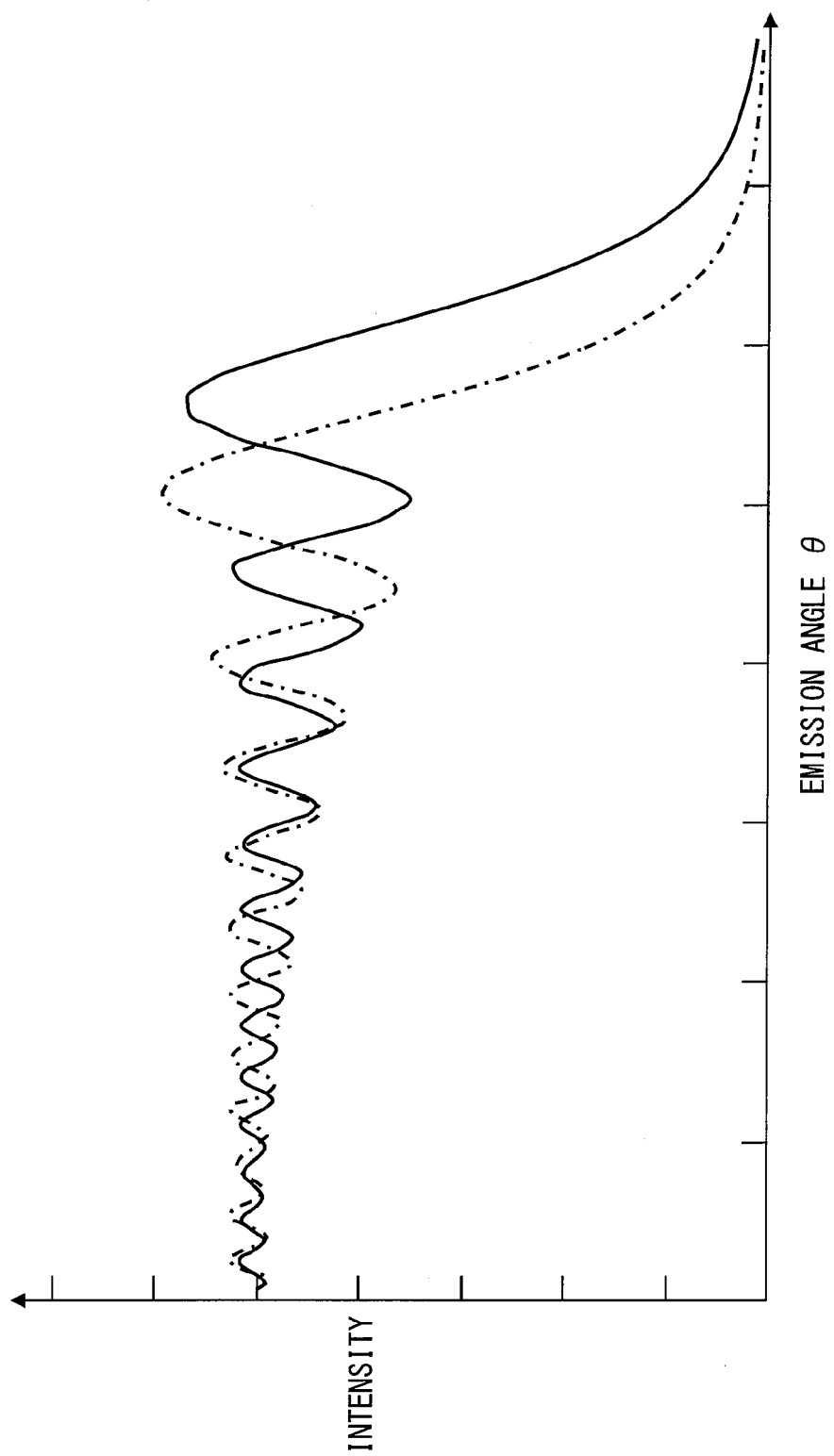
FIG. 9 is a characteristic diagram for explaining an intensity distribution of emitted light rays according to the first embodiment.
Figure 10:
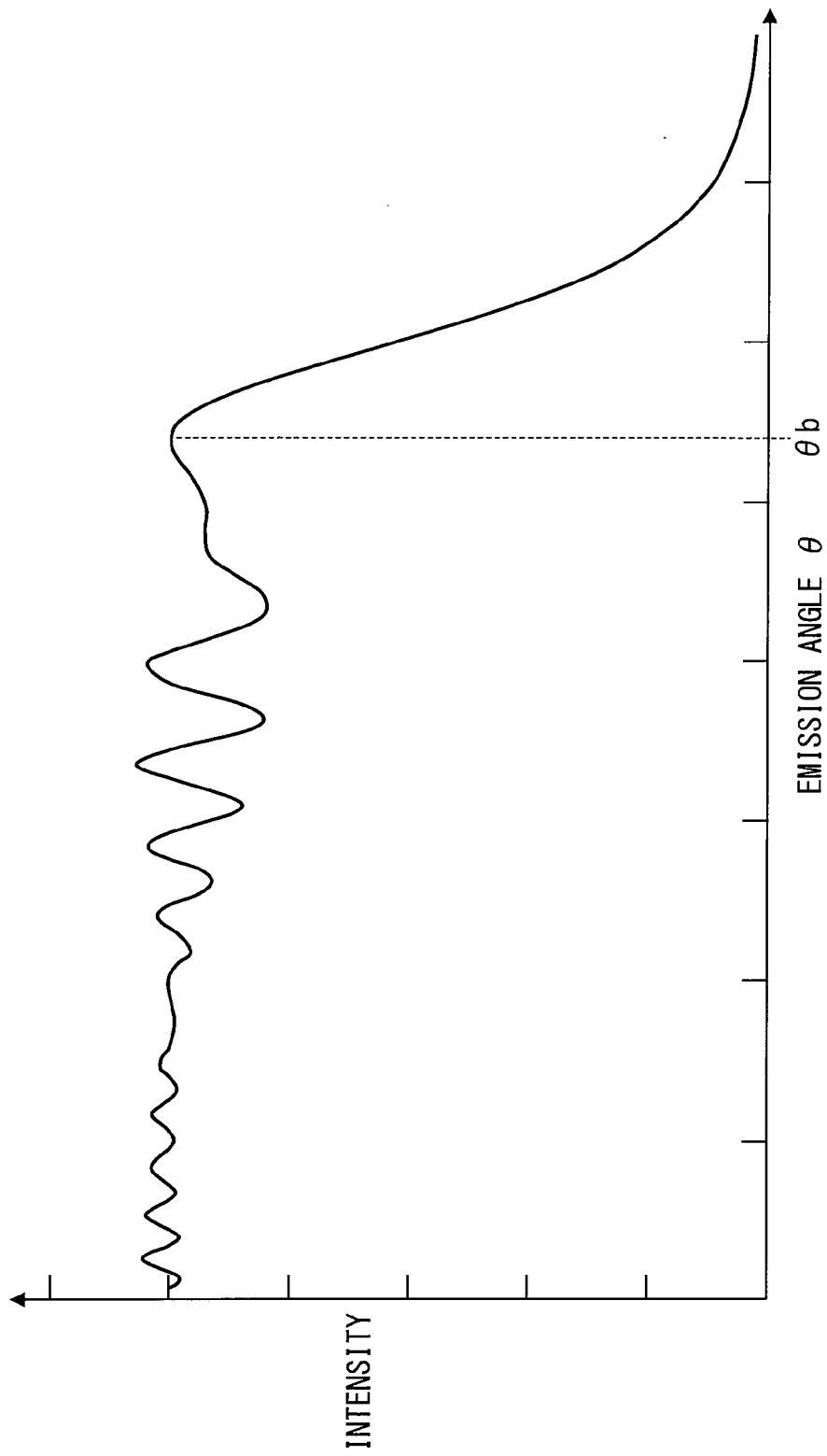
FIG. 10 is a characteristic diagram for explaining superposition of emitted light rays on each other according to the first embodiment.

In the first embodiment, as shown in FIG. 9, when it comes to an undulation of an intensity distribution dependent on an emission angle θ (θ as the reflection angle in the first embodiment) on each of the optical elements 32, an undulation caused by optical elements 32 having the large element width Wa (solid line in a graph) and an undulation caused by optical elements 32 having the small element width Wb (dot-dash line in the graph) are deviated from each other. Accordingly, peak intensities are hardly increased. In an intensity distribution shown in FIG. 10 and observed by superposing laser light rays, which are emitted from the optical elements 31 having the element widths Wa and Wb respectively, on each other, an undulation quantity is small around an emission angle θb corresponding to the boundary 35. Therefore, a luminance variance which a discerning person perceives can be suppressed according to the undulation quantity. Herein, the profound studies made by the present inventors demonstrate that the element widths Wa and Wb are preferably set to values that fall within a range from ±3.5% to ±5% of the peak pitch P (in the present embodiment, the peak pitch squares with a mean value of the element widths Wa and Wb) in terms of suppression of the luminance variance.

The present inventors have gotten such findings that when laser light rays emitted from the curved surfaces 33 of the faces of adjoining optical elements 32 interfere with each other, diffracted light exhibiting an intensity distribution that has plural orders of diffraction peaks associated with emission angles is generated, and a luminance variance is derived from the multiple diffraction.

In the first embodiment, as shown in FIG. 6, the sag quantity S that differs between adjoining optical elements 32 is designated over the entire scanning surface 31. In particular, as the sag quantity S in the first embodiment, two large and small sag quantities Sa and Sb are designated. Optical elements 32 having the large sag quantity Sa and optical elements 32 having the small sag quantity Sb are alternately arrayed in both of the directions x and y. Owing to the arrayed form, adjoining optical elements 32 form a step in the direction z according to a difference (Sa−Sb) between the sag quantities Sa and Sb.

Figure 11:
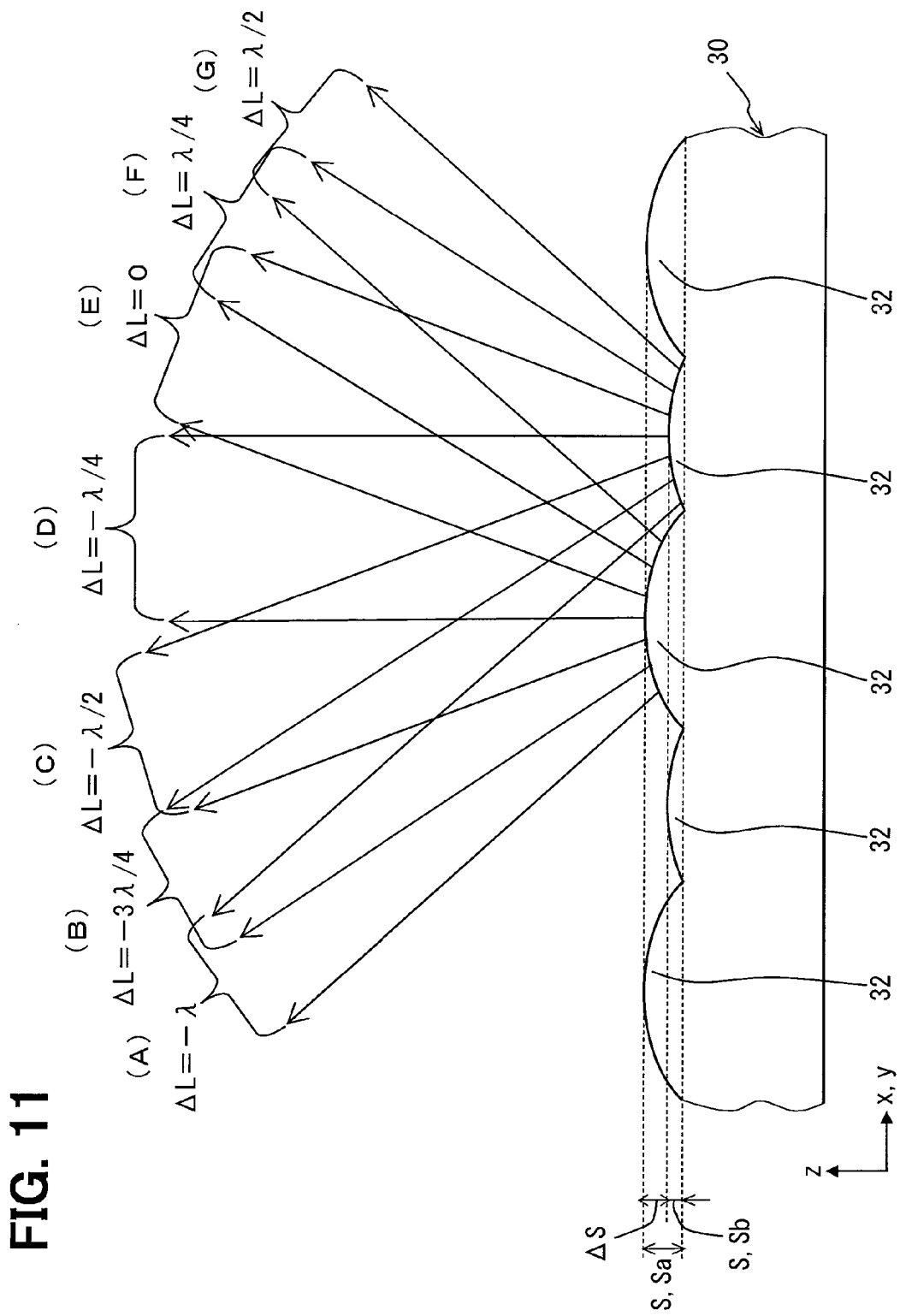
FIG. 11 is a schematic diagram for explaining an optical path difference of emitted light rays according to the first embodiment.

In the first embodiment, an optical path difference ΔL between laser light rays that are emitted at emission angles θ (θ in FIG. 9 as a reflection angle in the first embodiment) from the curved surfaces 33 of the faces of adjoining optical elements 32 and interfere with each other is produced as shown in, for example, FIG. 11. Herein, assuming that a distance between surface vertices 34 of adjoining optical elements 32 is defined as a peak pitch P (see FIGS. 5 and 6), and a difference between sag quantities Sa and Sb of the adjoining elements 32 is defined as ΔS, the optical path difference ΔL is expressed as a formula (1) or (2) below using the peak pitch P, which is sufficiently larger than ΔS, under a condition that sin θ approximates to θ [rad]. More particularly, the formula (1) is established between one optical element 32 having the large sag quantity Sa and an adjoining optical element having the small sag quantity Sb on one side (for example, right side in FIG. 6) of the optical element. The formula (2) is established between the one optical element 32 having the large sag quantity Sa and an adjoining optical element 32 having the small sag quantity Sb on the opposite side (for example, the left side in FIG. 6). Assuming that λ denotes the wavelength of laser light, an angle difference α in the emission angle θ which causes the optical path difference ΔL to change by the wavelength λ, that is, the angle difference α in the emission angle θ which causes the order of a diffraction peak to change by 1 is expressed as a formula (3) below, which employs the peak pitch P, under a condition that sin α approximates to α.

$$\Delta L = P \cdot \theta - 2 \cdot \Delta S \quad (1)$$

$$\Delta L = P \cdot \theta + 2 \cdot \Delta S \quad (2)$$

$$\alpha = \lambda / P \quad (3)$$

Figure 12:
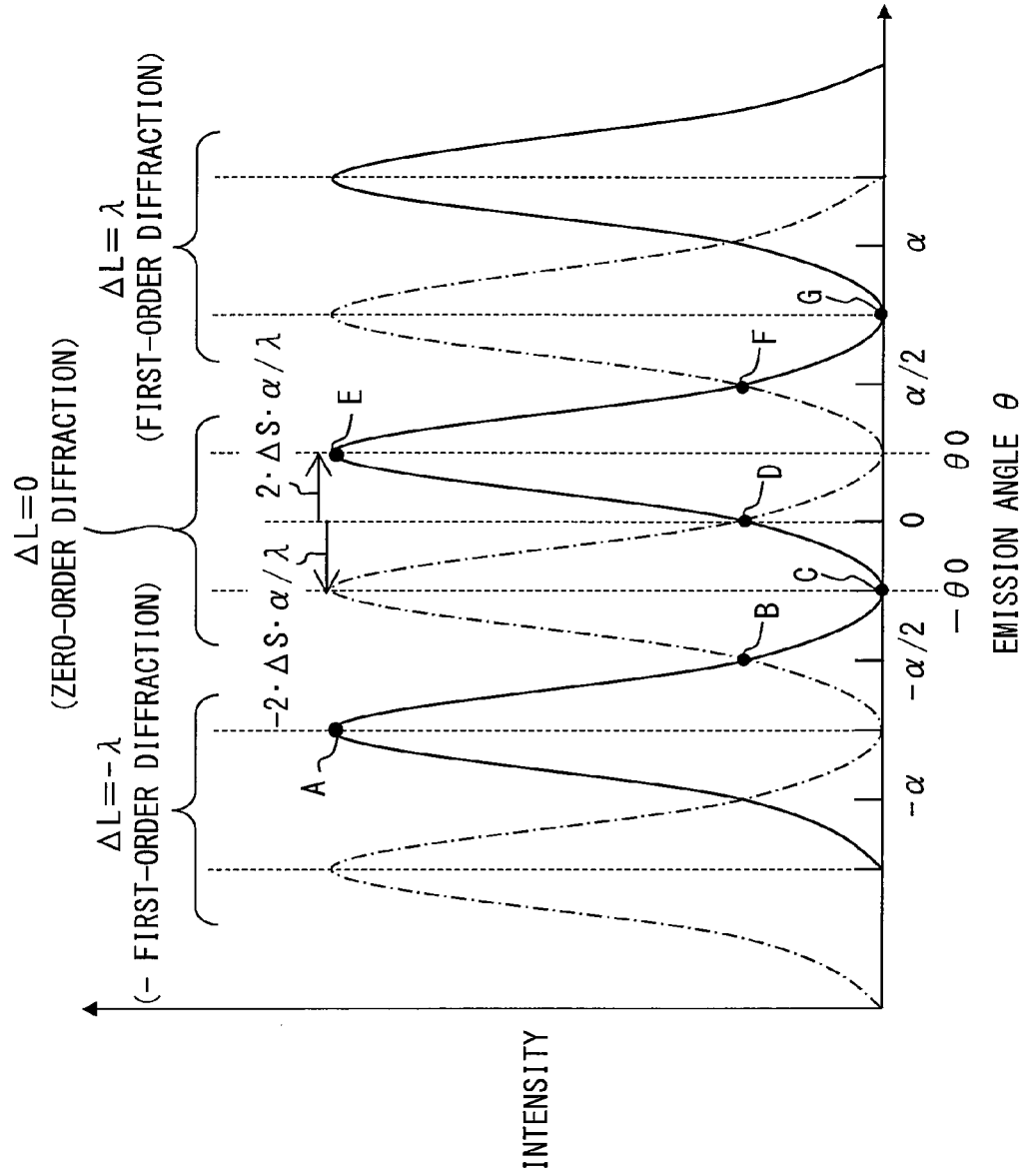
FIG. 12 is a characteristic diagram for explaining an intensity distribution of diffracted light according to the first embodiment.

Thinking of an intensity distribution, which is observed when the optical path difference ΔL in the first embodiment becomes 0 or ±λ, that is, the order of a diffraction peak becomes 0 or ±1, on the basis of the formulae (1), (2), and (3), the intensity distribution is, as seen from FIG. 12, dependent on the angle difference α in the emission angle θ. According to the intensity distribution, based on the formulae (1) and (3), diffraction peaks induced by one optical element 32, which has the large sag quantity Sa, and an adjoining element 32 on one side of the optical element, which has the small sag quantity Sb, are centered on the emission angles θ that begin with a zero-order diffraction angle θ0, which is deviated from 0 by $2 \cdot \Delta S \cdot \alpha / \lambda$, and vary in units of ±α (solid line in the graph). Based on the formulae (2) and (3), diffraction peaks induced by the one optical element 32, which has the large sag quantity Sa, and an adjoining element 32 on the opposite side, which has the small sag quantity Sb, are centered on the emission angles θ that begin with a zero-order diffraction angle −θ0, which is deviated from 0 by $-2 \cdot \Delta S \cdot \alpha / \lambda$, and vary in units of ±α (dot-dash line in the graph). FIG. 12 shows an example in which the diffraction peaks occur at the emission angles, which begin with θ0=α/4 or −θ0=−α/4 and vary in units of ±α, because of designation of ΔS=λ/8. Points A to G marked on the solid line in the graph of FIG. 12 correspond to directions A to G of diffracted light rays which produce optical path differences ΔL shown in FIG. 11.

In the first embodiment, diffraction peaks of diffracted light induced by one optical element 32 and an adjoining element 32 on one side of the optical element and diffraction peaks of diffracted light induced by the one optical element 32 and an adjoining element 32 on the other side of the optical element are centered on different emission angles θ and are therefore deviated from each other. As a result of the deviation effect, diffraction peaks caused by one optical element 32 and either of adjoining elements 32 are superposed on diffraction valleys caused by the one optical element and the other adjoining element 32. Therefore, intensities are hardly increased.

Figure 13:
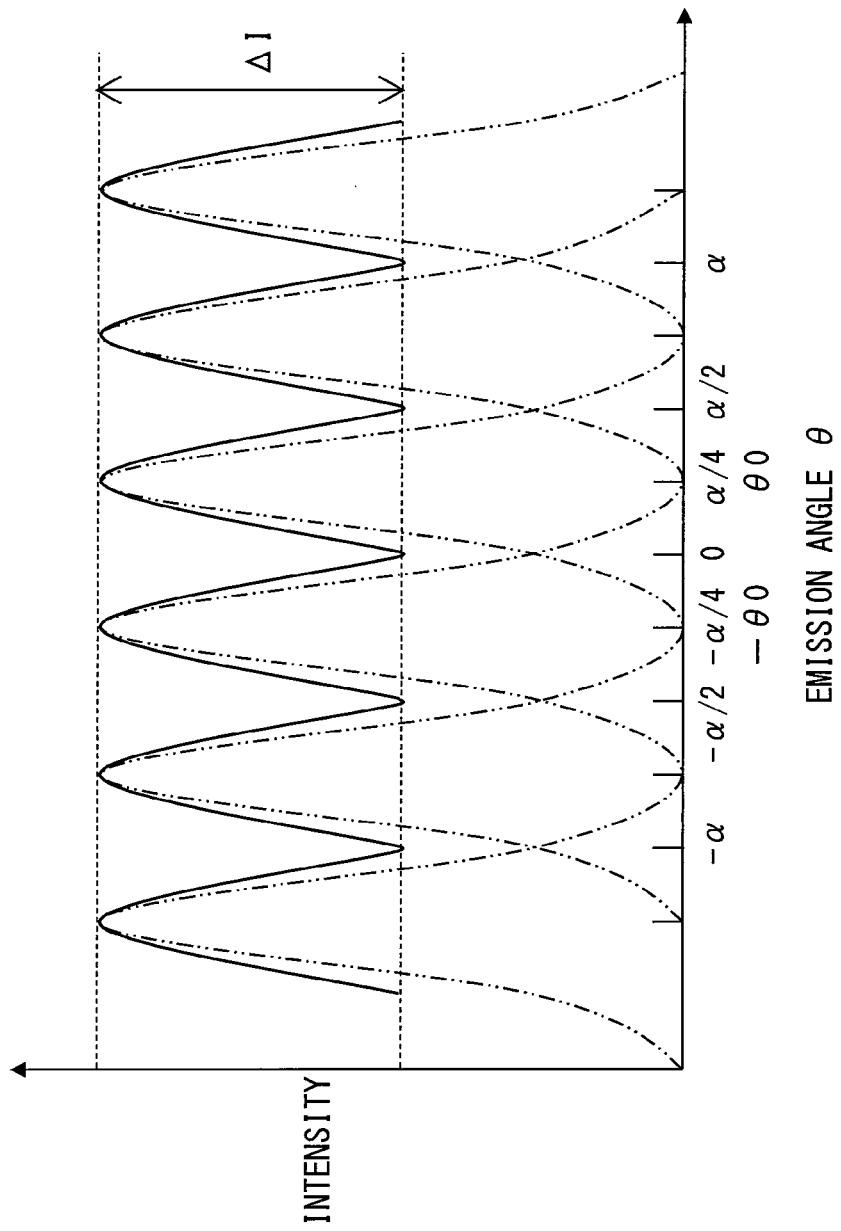
FIG. 13 is a characteristic diagram for explaining superposition of diffracted light rays on each other according to the first embodiment.

As mentioned above, according to an intensity distribution (solid line in a graph) which is shown in FIG. 13 and observed by superposing diffracted light rays (alternate long and two short dashes line in the graph), which are induced by one optical element 32 and adjoining elements 32 on both sides of the optical element, on each other, an intensity difference ΔI is small between each of emission angles θ (which begin with θ0 or −θ0 and vary in units of ±α) on which diffraction peaks are centered, and each of intermediate emission angles θ. For example, when ΔS=λ/8 is, similarly to FIG. 12, designated in FIG. 13, the intensity difference ΔI can be diminished between each of emission angles θ, which begin with α/4 or −α/4 and vary in units of ±α, and each of emission angles θ which begin with 0 and vary in units of ±α/2. Therefore, a luminance variance which a discerning person perceives can be suppressed according to the small intensity difference ΔI.

Figure 14:
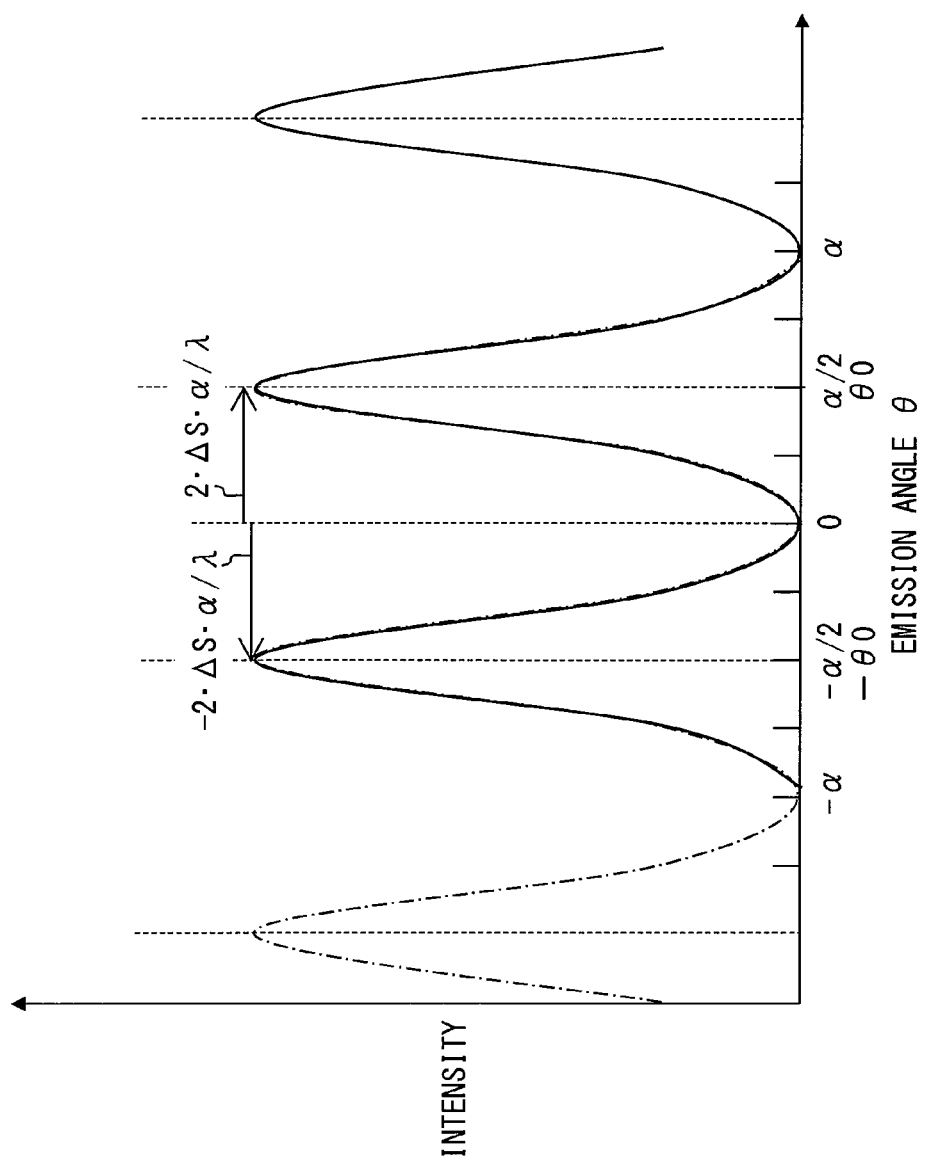
FIG. 14 is a characteristic diagram for explaining designation of a sag quantity difference according to the first embodiment.

As described so far, the first embodiment adopts a structure in which the optical elements 32 reflect laser light from the curved surfaces 33 so as to diffuse and emit the laser light. In the structure, assuming that m denotes an arbitrary odd number equal to or larger than 1, if a difference ΔS between the sag quantities of adjoining optical elements 32 is consistent with m·λ/4, there arises a fear that diffraction peaks caused by one optical element 32 and an adjoining element 32 on one of the sides of the optical element may, as shown in FIG. 14, be superposed on diffraction peaks caused by the one optical element 32 and an adjoining element 32 on the other side of the optical element. This is because in case ΔS=m·λ/4 is designated (in the example shown in FIG. 14, ΔS=α/4 is designated), the diffraction peaks occur at emission angles that begin with θ0=α/2 or −θ0=−α/2 and vary in units of ±α.

In the first embodiment, therefore, the sag quantity difference ΔS between adjoining optical elements 32 is set to a value allowing a formula (4) below to be established. Further, the sag quantity difference ΔS allowing the formula (4) to be established is preferably set to a value allowing a formula (5) below to be established. Above all, the sag quantity difference ΔS is more preferably set to a value allowing a formula (6) below to be established.

$$\Delta S \neq m \cdot \lambda/4 \quad (4)$$

$$(2m-1) \cdot \lambda/16 < \Delta S < (2m+1) \cdot \lambda/16 \quad (5)$$

$$\Delta S = m \cdot \lambda/8 \quad (6)$$

In the first embodiment employing multi-color laser light, the wavelength λ in the formulae (4), (5), and (6) is supposed to be the wavelength of laser light of at least one color. For example, if the wavelength λ is supposed to be the wavelength of the laser light of one color, the peak wavelength of green laser light exhibiting high luminous efficiency or the peak wavelength of red laser light exhibiting a large diffraction angle is preferably supposedly adopted as the wavelength λ. If the wavelength λ is supposed to be the wavelength of each of laser light rays of two or more colors, m is set to a value that varies depending on the color. Accordingly, the formulae (4), (5), and (6) can be established.

In the first embodiment in which any of the formulae (4), (5), and (6) is established, as far as laser light of at least one color is concerned, since the sag quantity difference ΔS between adjoining optical elements 32 is inconsistent with m·λ/4, superposition of diffraction peaks on other diffraction peaks can be avoided. In FIG. 6, for a better understanding, the sag quantity difference ΔS is shown to be larger than an actual one.

In the first embodiment, in order to realize all the aforesaid features, the large sag quantity Sa is set for the optical elements 32 having the large element width Wa and the small sag quantity Sb is set for the optical elements 32 having the small element width Wb. The radius of curvature R that remains equal on a longitudinal section containing the surface vertices 34 is set for the curved surfaces 33 of the faces of the optical elements 32 in both of the directions x and y over the entire scanning surface 31. As shown in FIGS. 5 and 6, the peak pitch P that remains equal is set as a distance between the surface vertices 34 of adjoining optical elements 32 for the optical elements 32 in both of the directions x and y over the entire scanning surface 31. Further, a double value of the peak pitch P in both of the directions x and y is set to a value equal to the sum (Wa+Wb) of the large element width Wa and small element width Wb.

Figure 15:
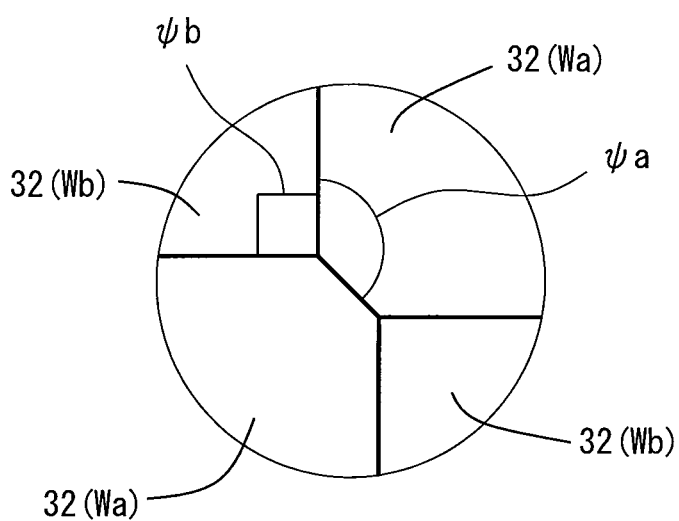
FIG. 15 is a plan view showing a pivotal part of the screen member, which is shown in FIG. 5, in enlargement.

With the foregoing settings, each of the optical elements 32 having the small element width Wb has, as shown in FIG. 5, a square shape when seen in the direction z, and therefore adjoins four elements 32, which have the large element width Wa, with the boundaries 35 having a linear shape and being interposed among them. Therefore, an internal angle ψb of each of the corners of the optical elements 32 having the small element width Wb is, as shown in FIG. 15, 90°. each of the optical elements 32 having the large element width Wa has, as shown in FIG. 5, a substantially octagonal shape created by cutting the corners of a square shape when seen in the direction z, and not only adjoins four elements 32, which have the small element width Wb, with the linear boundaries 35 interposed among them but also adjoins four other elements 32 having the large element width Wa. Accordingly, an internal angle ψa of each of the corners of the optical elements 32 having the large element width Wa is, as shown in FIG. 15, 135°.

(Advantageous Effects)

The advantageous effects of the aforesaid first embodiment will be described below.

In the first embodiment, since laser light rays emitted from the boundaries 35 among adjoining optical elements 32 interfere with each other due to diffraction, an undulatory intensity distribution appears in the light rays emitted from the adjoining optical elements 32. Among the optical elements 32 adjoining in the horizontal direction x and the vertical direction y, which are one array direction and another array direction in the array of the grating, the undulations of the intensity distributions are deviated from each other according to the difference in the element width W (between Wa and Wb). Accordingly, the light rays emitted from the adjoining optical elements 32 are discerned as the virtual image 70 by a discerning person with the undulations of the intensity distributions deviated from each other. Thus, an effect of further suppression of a luminance variance which the discerning person perceives can be exerted.

In the first embodiment, the element width W (Wa, Wb) that differs between adjoining optical elements 32 is realized over the entire scanning surface 31 on one side of the screen member 30 on which the curved surfaces 33 of the faces of the optical elements 32 are formed. Accordingly, the deviation in the undulations of the intensity distributions can be generated irrespective of the element position on the scanning surface 31. Eventually, a high effect of suppression of a luminance variance which a discerning person perceives can be attained.

In the first embodiment, owing to the arrayed form, the optical elements 32 have the same relationship in the value of the element width W in comparison with an adjoining optical element 32 in both of the horizontal direction x and vertical direction y. Accordingly, the shape of the optical elements 32 required for the array in each of directions x and y can be simplified as much as possible. Therefore, the structure of the screen member 30 is simplified, resulting in the ease of design and the ease of production.

In the first embodiment, the optical elements 32 are formed so that the sag quantity S (Sa or Sb) from the surface vertex 34 on the curved surface 33 of an optical element 32 to the boundary 35 between adjoining optical elements 32 differs between the adjoining optical elements 32. According to the setting of the sag quantity S(Sa, Sb) differing between the adjoining optical elements 32, diffraction peaks of diffracted light induced by one optical element 32 and one of adjoining elements 32 on both sides of the optical element are deviated from diffraction peaks induced by the optical element 32 and the other adjoining element 32. By utilizing the deviation effect, the diffraction peaks of diffracted light induced by one optical element 32 and an adjoining element 32 on one side of the optical element are superposed on diffraction valleys of diffracted light induced by the one optical element 32 and an adjoining element 32 on the opposite side. Thus, a luminance variance which a discerning person who discerns the diffracted light rays as a virtual image 70 can be suppressed.

(Second Embodiment)

Figure 16:
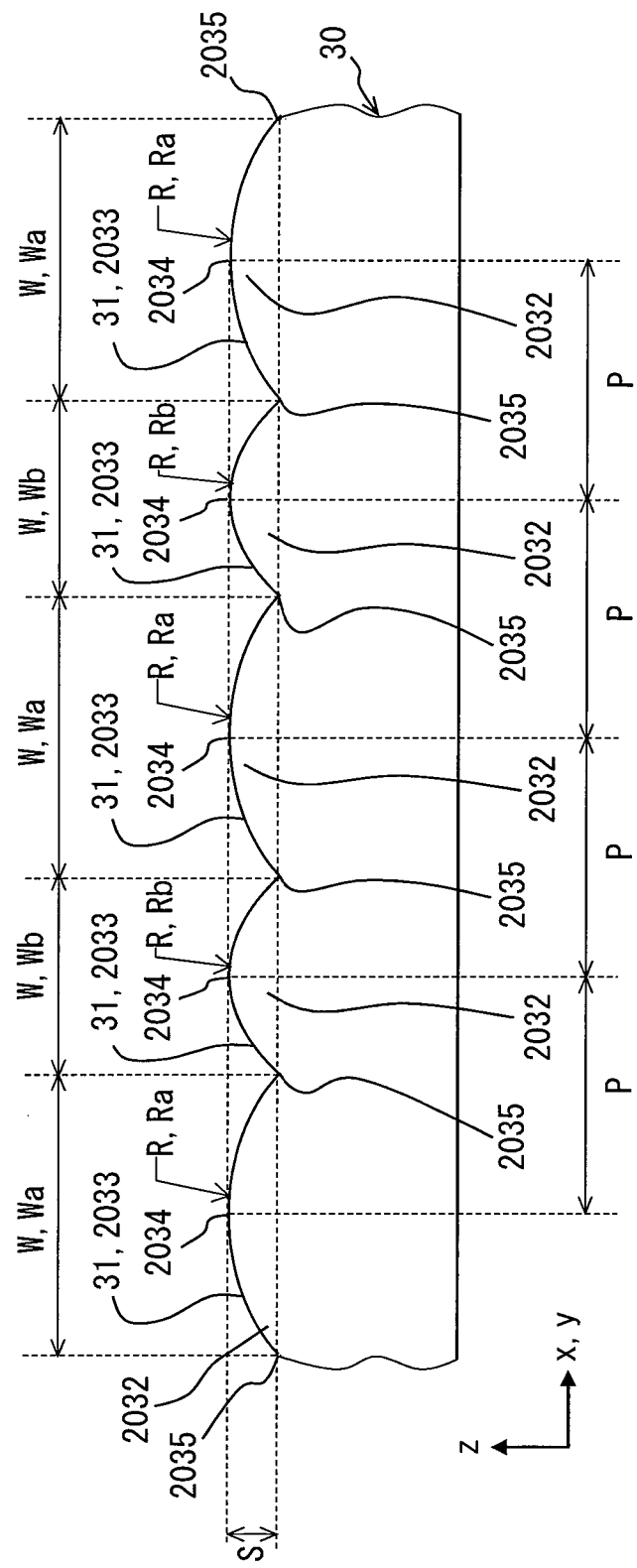
FIG. 16 is a schematic diagram partly showing the screen member according to the second embodiment and being equivalent to FIG. 6.

As shown in FIG. 16, the second embodiment of the present disclosure is a variant of the first embodiment. In the second embodiment, for optical elements 2032 that have the equal peak pitch P and have different element width W (Wa, Wb), a radius of curvature R of the curved surface 2033 is different between the adjoining optical elements 2032 in the entirety of the scanning surface 31. As the radius of curvature R in the second embodiment, two large and small radii of curvatures Ra and Rb are designated. Optical elements 2032 having the large radius of curvature Ra and optical elements 2032 having the small radius of curvature Rb are alternately arrayed in both of directions x and y. Owing to the arrayed form, the optical elements 2032 have the same relationship in the value of the radius of curvature R in comparison with an adjoining optical element in either of the horizontal direction x and vertical direction y.

In the second embodiment, the large radius of curvature Ra is set for the optical elements 2032 having the large element width Wa, and the small radius of curvature Rb is set for the optical elements 3032 having the small element width Wb. Further, in the direction z of the second embodiment, the sag quantity S from the surface vertex 2034 of the curved surface 2033 to the boundary 2035 is equal between the adjoining optical elements 2032 in the entirety of the scanning surface 31.

With the foregoing settings, each of the optical elements 2032 having the small element width Wb takes on a square shape (not shown) when seen in the direction z, and adjoins four elements 2032, which have the large element width Wa, with linear boundaries 2035 interposed among them. Similarly to the first embodiment, each of the optical elements 2032 having the large element width Wa takes on a square shape (not shown) when seen in the direction z, and adjoins four elements 2032, which have the large small element width Wb, as well as other four elements 2032 with the large element width Wa, with the linear boundaries 2035 interposed among them.

In the second embodiment, since the radius of curvature R differs between adjoining optical elements 2032, the different element width W (Wa, Wb) permitting suppression of a luminance variance can be reliably ensured. At the same time, in the second embodiment, the sag quantity S from the vertex 2034 of the curved surface 2033 to the boundary 2035 is equal between the adjoining optical elements 2032. Therefore, the shape of the optical elements 2032 can be simplified as much as possible. Therefore, the structure of the screen member 30 is simplified, resulting in the ease of design and ease of the production.

(Third Embodiment)

Figure 17:
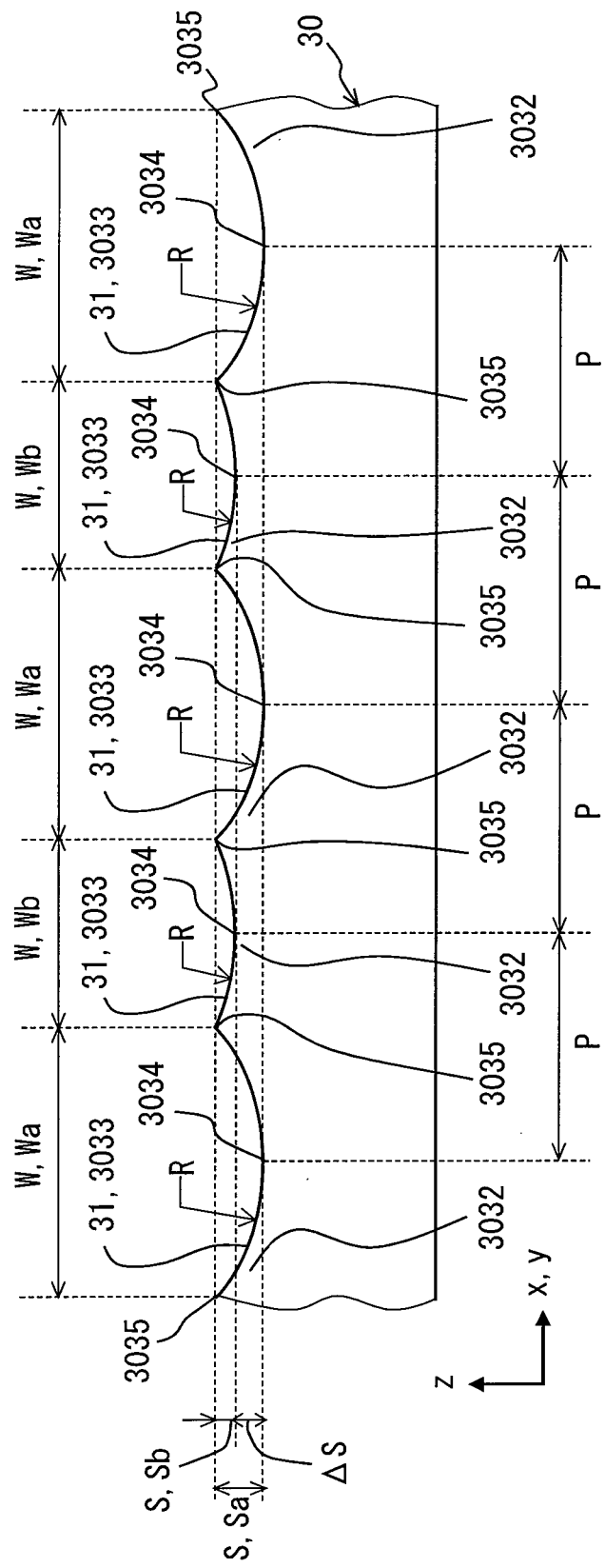
FIG. 17 is a schematic diagram partly showing a screen member according to a third embodiment and being equivalent to FIG. 6.

As shown in FIG. 17, the third embodiment of the present disclosure is a variant of the first embodiment. In the third embodiment, the faces of optical elements 3032 take on as a common curved form a concave curved form to be curved concavely, and are thus formed as arc surface-like curved surfaces 3033. The curved surfaces 3033 of the faces of the optical elements 3032 are dented from a side, on which the screen member 30 is opposed to the laser scanner 10 and optical system 40, to an opposite side in a direction z orthogonal to the directions x and y. The deepest concave points are regarded as surface vertices 3034. Specifically, the curved surfaces 3033 of the faces of the optical elements 3032 are formed on the scanning surface 31 on a side, on which the screen member 30 is opposed to the laser scanner 10 and optical system 40, out of the sides of the screen member 30 in the thickness direction (namely, the direction z) of the screen member 30. Owing to the structure, laser light projected from the laser scanner 10 onto the scanning surface 31 is reflected from the curved surfaces 3033 of the faces of the optical elements 3032, thus diffused from the curved surfaces 3033, and emitted to the optical system 40.

The optical elements 3032 adjoining in each of the directions x and y have the margins (contours) of their curved surfaces layered one another, whereby boundaries 3035 are formed among the optical elements. Herein, as for the curved surfaces 3033 of the faces of the optical elements 3032 in the third embodiment, a height that is a gap quantity from each of surface vertices 3034 serving as a reference in the direction z to each of the boundaries 3035 (inflection point on a longitudinal section) is defined as a sag quantity S.

According to the third embodiment having the same features as the first embodiment except the foregoing feature, the same advantageous effects as the ones of the first embodiment can be exerted.

(Fourth Embodiment)

Figure 18:
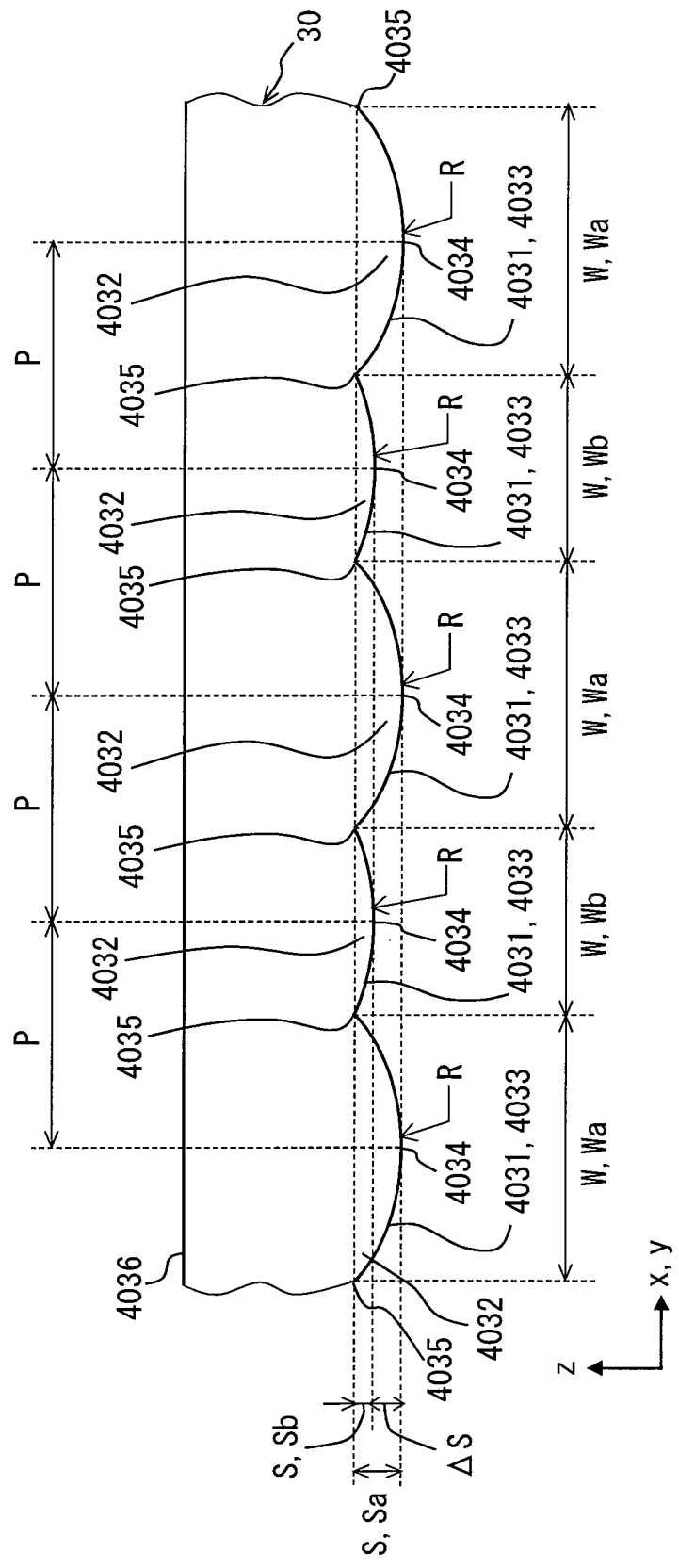
FIG. 18 is a schematic diagram partly showing a screen member according to a fourth embodiment and being equivalent to FIG. 6.

As shown in FIG. 18, the fourth embodiment of the present disclosure is a variant of the first embodiment. Curved surfaces 4033 of the faces of optical elements 4032 in the fourth embodiment are jutted out on a side opposite to a side on which the screen member 30 is opposed to the laser scanner 10 and optical system 40 in a direction z orthogonal to the directions x and y. The highest jutted points are regarded as surface vertices 4034. Specifically, the curved surfaces 4033 of the faces of the optical elements 4032 are formed on a scanning surface 4031 on a side of the screen member 30, which is opposite to the side on which the screen member 30 is opposed to the laser scanner 10 and optical system 40 and on which an optical surface 4036 is formed, out of the sides of the screen member 30 in a thickness direction (that is, the direction z). Owing to the structure, laser light projected from the laser scanner 10 onto the optical surface 4036 is transmitted by the screen member 30, and fed to the curved surfaces 4033 of the faces of the optical elements 4032. As a result, the laser light is, as shown in FIG. 19, reflected from the curved surfaces 4033 of the faces of the optical elements 4032, transmitted by the screen member 30, diffused from the optical surface 4036, and then emitted to the optical system 40.

Even in the directions x and y in the fourth embodiment, the adjoining optical elements 4032 have the margins (contours) of their curved surfaces 4033 layered one another, whereby boundaries 4035 are formed among the optical elements. As for the curved surfaces 4033 of the faces of the optical elements 4032, a height that is a gap quantity from each of surface vertices 4034, which serve as a reference in the direction z, to each of the boundaries 4035 (inflection point on a longitudinal section) is defined as a sag quantity S. Herein, conformably to the first embodiment, different sag quantities S, that is, large and small sag quantities Sa and Sb are set for the adjoining optical elements 4032 over an entire scanning surface 4031. In addition, conformably to the first embodiment, different element widths W on a longitudinal section containing the surface vertices 4034, that is, large and small element widths Wa and Wb are set for the adjoining optical elements 4032 over the entire scanning surface 4031.

Figure 19:
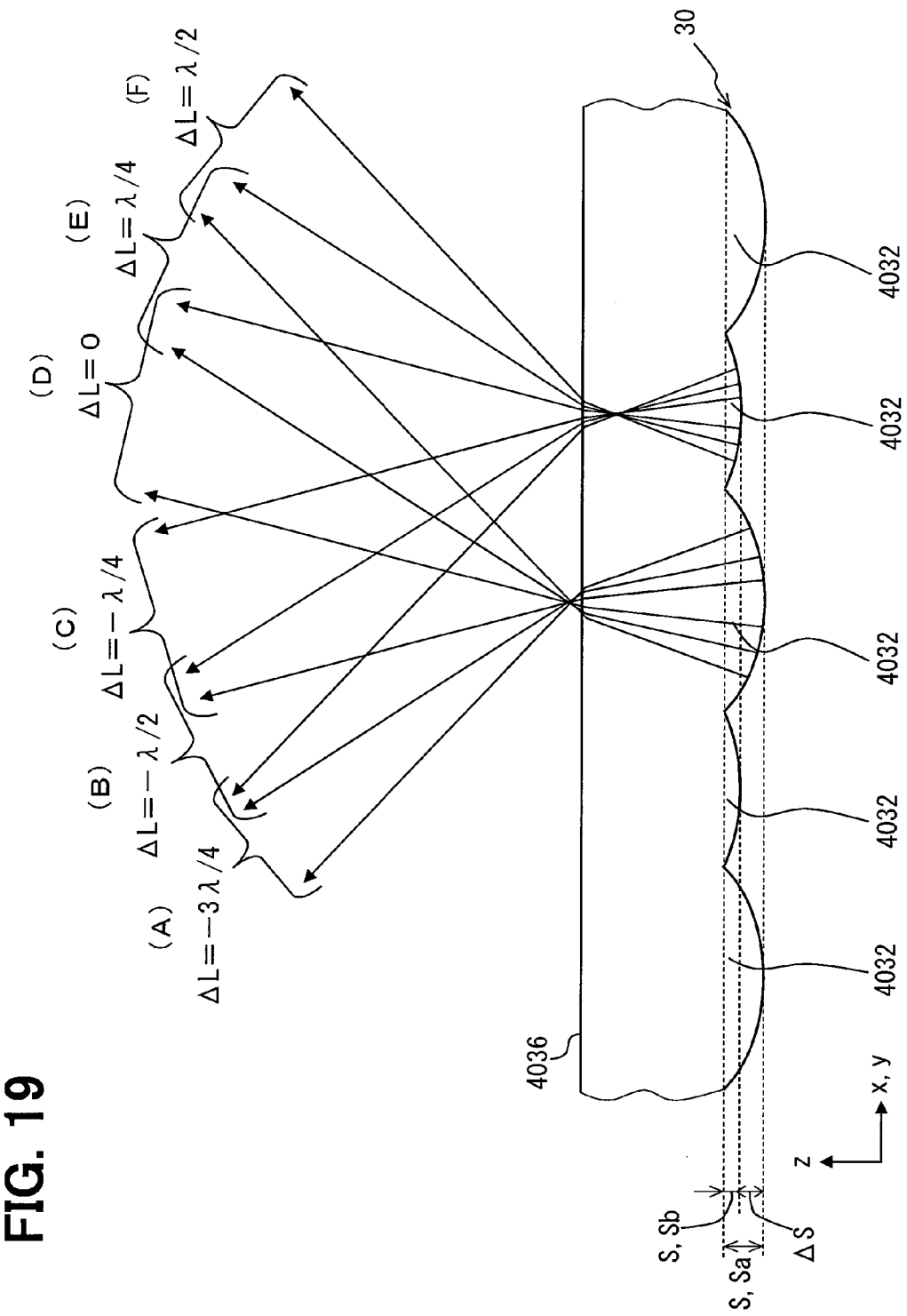
FIG. 19 is a characteristic diagram for explaining an optical path difference of emitted light rays according to the fourth embodiment.

In the fourth embodiment, an optical path difference ΔL between laser light rays that are reflected from the curved surfaces 4033 of the faces of the adjoining optical elements 4032 and emitted through the optical surface 4036 at emission angles θ is produced as shown in, for example, FIG. 19. Herein, assuming that ΔS denotes a difference between the sag quantities Sa and Sb of adjoining elements 4032, the optical path difference ΔL can be expressed as the formula (1) or (2) similarly to the first embodiment. An angle difference a in the emission angle θ causing the optical path difference ΔL to change by a wavelength λ is expressed as the formula (3) similarly to the first embodiment.

Even in the fourth embodiment, diffraction peaks of diffracted light induced by one optical element 4032 and one of adjoining elements 4032 on both sides of the optical element 4032 are deviated from diffraction peaks of diffracted light induced by the one optical element 4032 and the other adjoining element because the diffraction peaks are centered on different emission angles θ due to the principle identical to that in the first embodiment. As a result of the deviation effect, diffraction peaks induced by one optical element 4032 and either of adjoining elements 4032 are superposed on diffraction valleys induced by the one optical element 4032 and the other adjoining element 4032. Therefore, intensities are hardly increased. In an intensity distribution observed by superposing diffracted light rays, which are induced by one optical element and adjoining elements 4032 on both sides of the one optical element, on one another, an intensity difference is small between each of emission angles θ, on which diffraction peaks are centered, and each of intermediate emission angles θ. Eventually, a luminance variance a discerning person perceives can be suppressed according to the small intensity difference.

As mentioned above, the fourth embodiment adopts such a structure that the optical elements 4032 reflect laser light from the curved surfaces 4033 so as to diffuse the laser light and emit the laser light through the optical surface 4036 on the side opposite to the side on which the curved surfaces 4033 are formed. In the structure, assuming that m denotes an arbitrary odd number equal to or larger than 1 and n denotes the refractive index of the screen member 30, the difference ΔS between the sag quantities of adjoining optical elements 4032 is supposed to be consistent with m·λ/4/n. In this case, there is a fear that diffraction peaks caused by one optical element 4032 and either of adjoining elements on both sides of the optical element may be superposed on diffraction peaks caused by the one optical element 4032 and the other adjoining element. This is because in case ΔS=m·λ/4/n is established, the diffraction peaks occur at emission angles which begin with θ0=α/2/n or −θ0=−α/2/n in units of ±α.

In the fourth embodiment, the sag quantity difference ΔS between adjoining optical elements 4032 is set to a value which allows a formula (7) below to be established. Further, the sag quantity difference ΔS which allows the formula (7) to be established is preferably set to a value which allows a formula (8) below to be established. In particular, the sag quantity difference ΔS is preferably set to a value which allows a formula (9) below to be established. With one of the formulae (7), (8), and (9) established, in the fourth embodiment, the difference ΔS between the sag quantities (Sa and Sb) of adjoining optical elements 4032 is inconsistent with m·λ/4/n. Thus, superposition of diffraction peaks on other diffraction peaks is reliably avoided.

$$\Delta S \neq m \cdot \lambda/4/n \tag{7}$$

$$(2m-1) \cdot \lambda/16/n < \Delta S < (2m+1) \cdot \lambda/16/n \tag{8}$$

$$\Delta S = M \cdot \lambda/8/n \tag{9}$$

Even in the fourth embodiment, similarly to the first embodiment, multi-color laser light is employed. The wavelength λ in the formulae (7), (8), and (9) is supposed to be the wavelength of laser light of at least one color. For example, when the wavelength λ is supposed to be the wavelength of laser light of one color, the peak wavelength of green laser light or red laser light is preferably supposedly adopted as the wavelength λ. When the wavelength λ is supposed to be the wavelength of each of laser light rays of two or more colors, m is set to a value that varies depending on the color. Thus, the formulae (7), (8), and (9) can be established.

According to the fourth embodiment having the same features as the first embodiment except the foregoing feature, the same advantageous effects as the ones of the first embodiment can be exerted.

(Other Embodiments)

The embodiments of the present disclosure have been described so far. The present disclosure is not limited to the embodiments but can be applied to various embodiments and combinations without a departure from the gist of the present disclosure.

Figure 20:
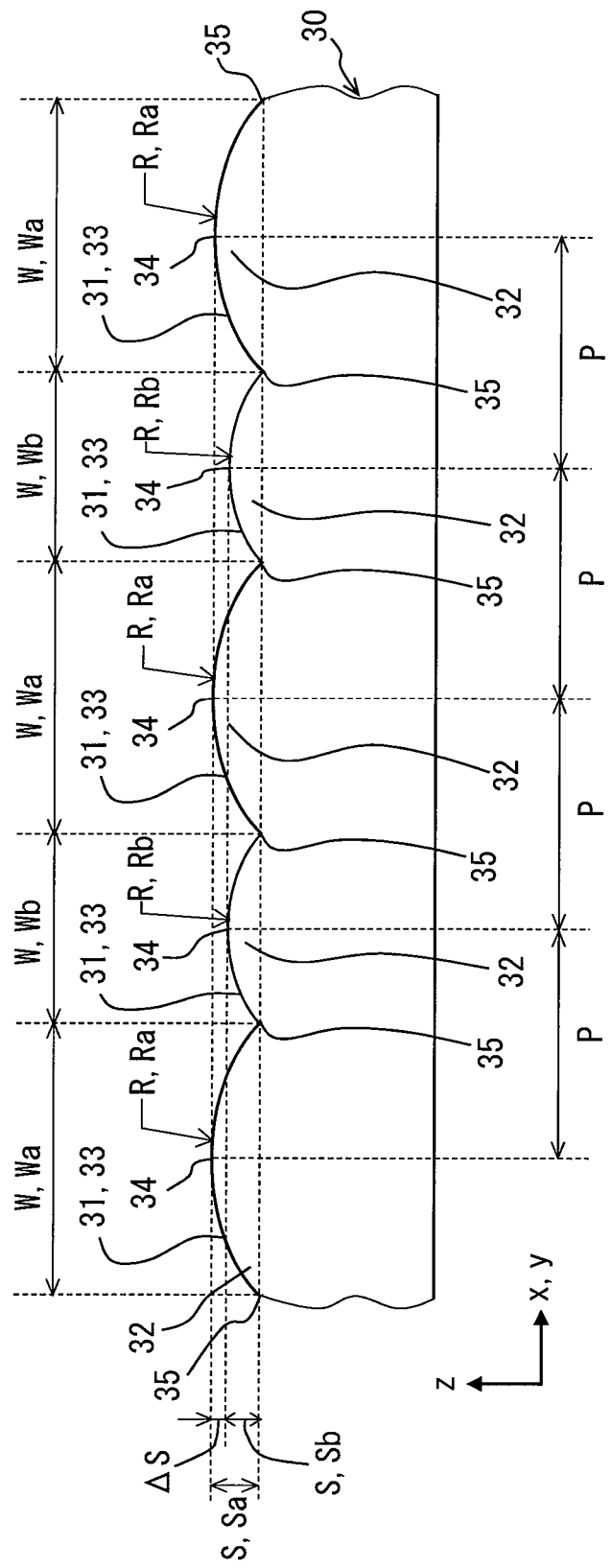
FIG. 20 is a schematic diagram partly showing a screen member as a variant 1 applied to the first embodiment and being equivalent to FIG. 6.
Figure 21:
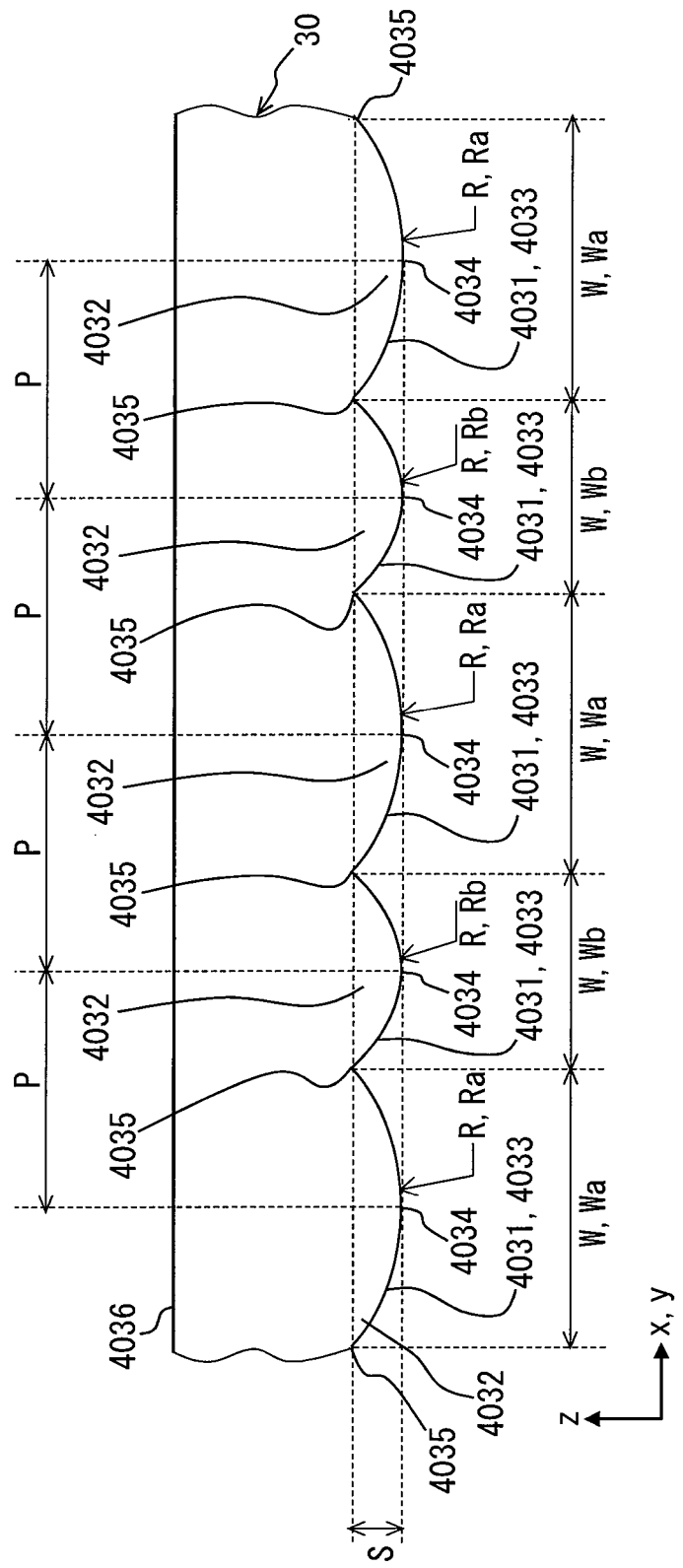
FIG. 21 is a schematic diagram partly showing a screen member as variants 1 and 6 applied to the fourth embodiment and being equivalent to FIG. 18.

More particularly, as a variant 1 relating to the first, third, and fourth embodiments, as shown in FIGS. 20 and 21, the radius of curvature R (Ra, Rb) that differs between adjoining optical elements 32, or 4032, may be designated conformably to the second embodiment. FIG. 21 shows the variant 1 applied to the fourth embodiment.

Figure 22:
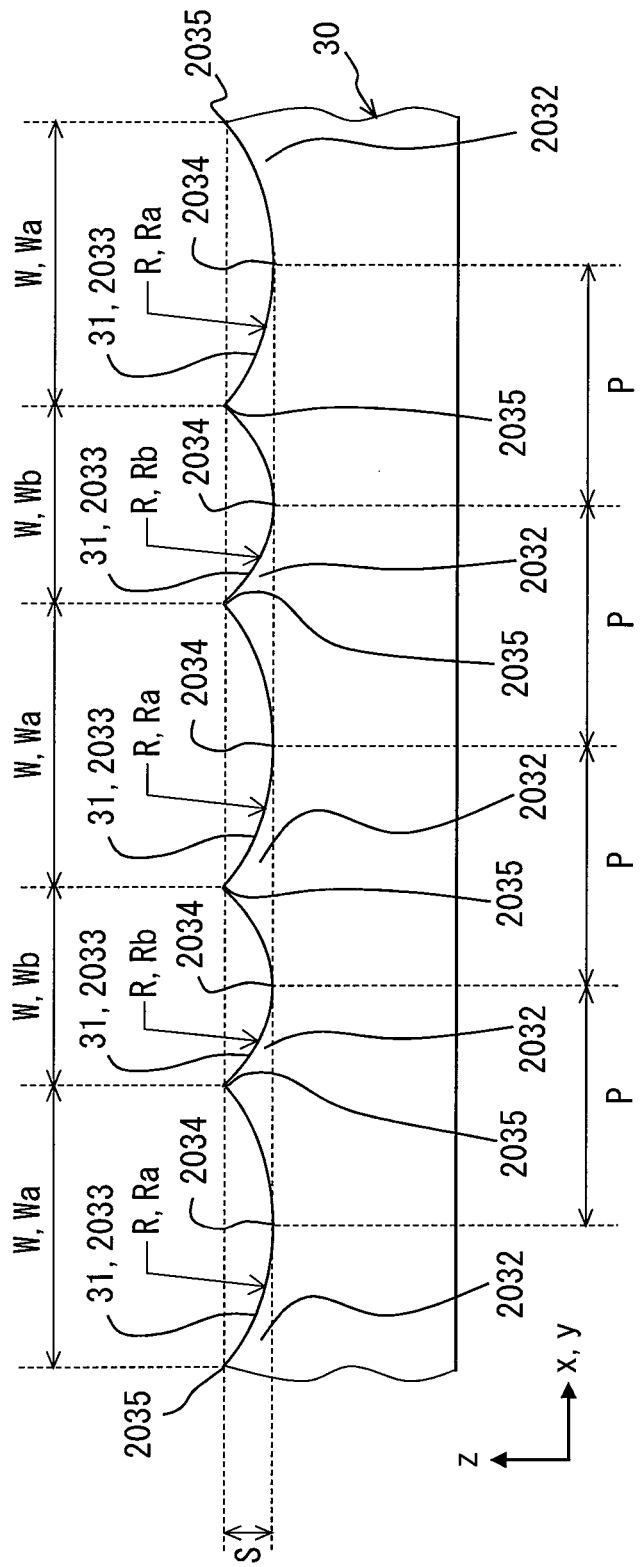
FIG. 22 is a schematic diagram partly showing a screen member as a variant 2 applied to the second embodiment and being equivalent to FIG. 16.
Figure 23:
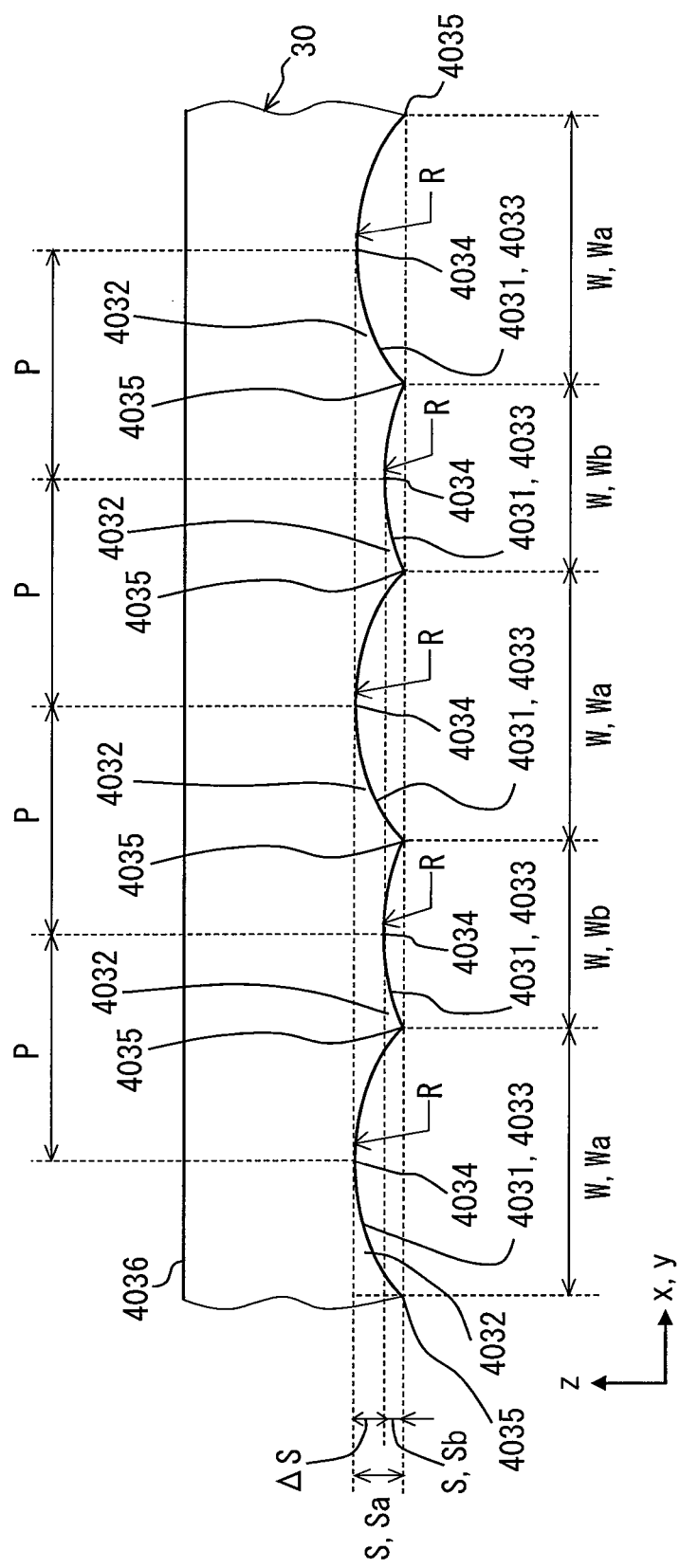
FIG. 23 is a schematic diagram partly showing a screen member as a variant 2 applied to the fourth embodiment and being equivalent to FIG. 18.

As a variant 2 relating to the second and fourth embodiments, as shown in FIGS. 22 and 23, the curved surfaces 2033, or 4033 having a concavely curved form to be curved concavely may be adopted conformably to the third embodiment. FIG. 22 shows the variant 2 applied to the second embodiment, and FIG. 23 shows the variant 2 applied to the fourth embodiment.

Figure 24:
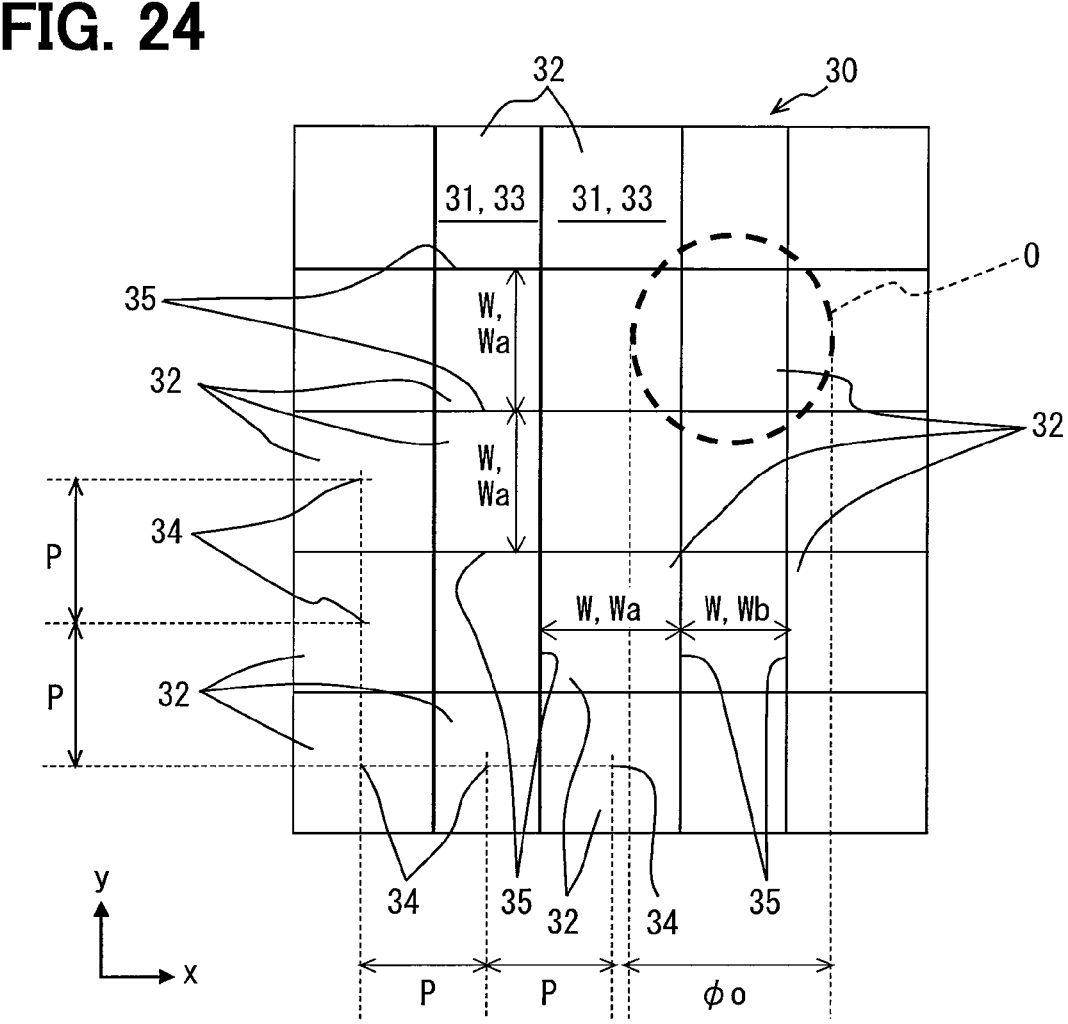
FIG. 24 is a schematic diagram partly showing a screen member as variants 3 and 8 applied to the first embodiment and being equivalent to FIG. 5.

As a variant 3 relating to the first to fourth embodiments, it may be adopted a structure in which the element width W (Wa or Wb) differs in one of the directions x and y between the adjoining optical elements 32, 2032, 3032, or 4032, and the element width W is equal in the other of the directions x and y between the adjoining optical elements 32, 2032, 3032, 4032. FIG. 24 shows the variant 3 applied to the first embodiment in which the element width W (Wa, Wb) is different in the direction x and the element width W is equal in the direction y (e.g., Wa as shown in FIG. 24).

Figure 25:
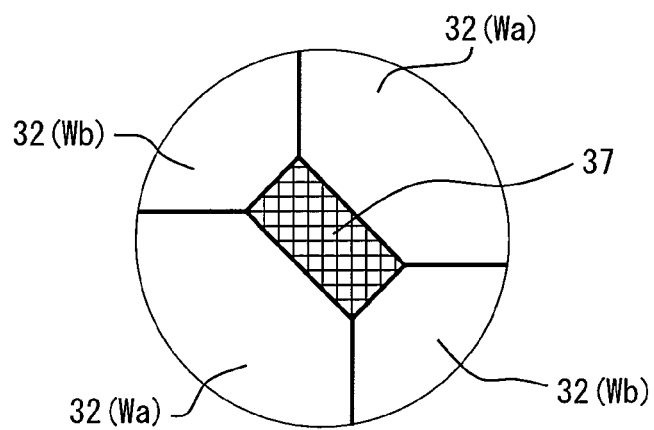
FIG. 25 is a schematic diagram partly showing a screen member as a variant 4 applied to the first embodiment and being equivalent to FIG. 15.

As a variant 4 relating to the first to fourth embodiments, as shown in FIG. 25, each of the optical elements 32, 2032, 3032 or 4032 that have the large element width Wa and take on a substantially octagonal shape may adjoin four other elements 32, 2032, 3032, or 4032, which have the large element width Wa, with planar parts 37 (hatched area in FIG. 25) interposed among them. In this case, each of the optical elements 32, 2032, 3032, or 4032 having the small element width Wb adjoin four other elements 32, 2032, 3032, or 4032, which have the small element width Wb, with the planar parts 37 among them. FIG. 25 shows the variant 4 applied to the first embodiment.

Figure 26:
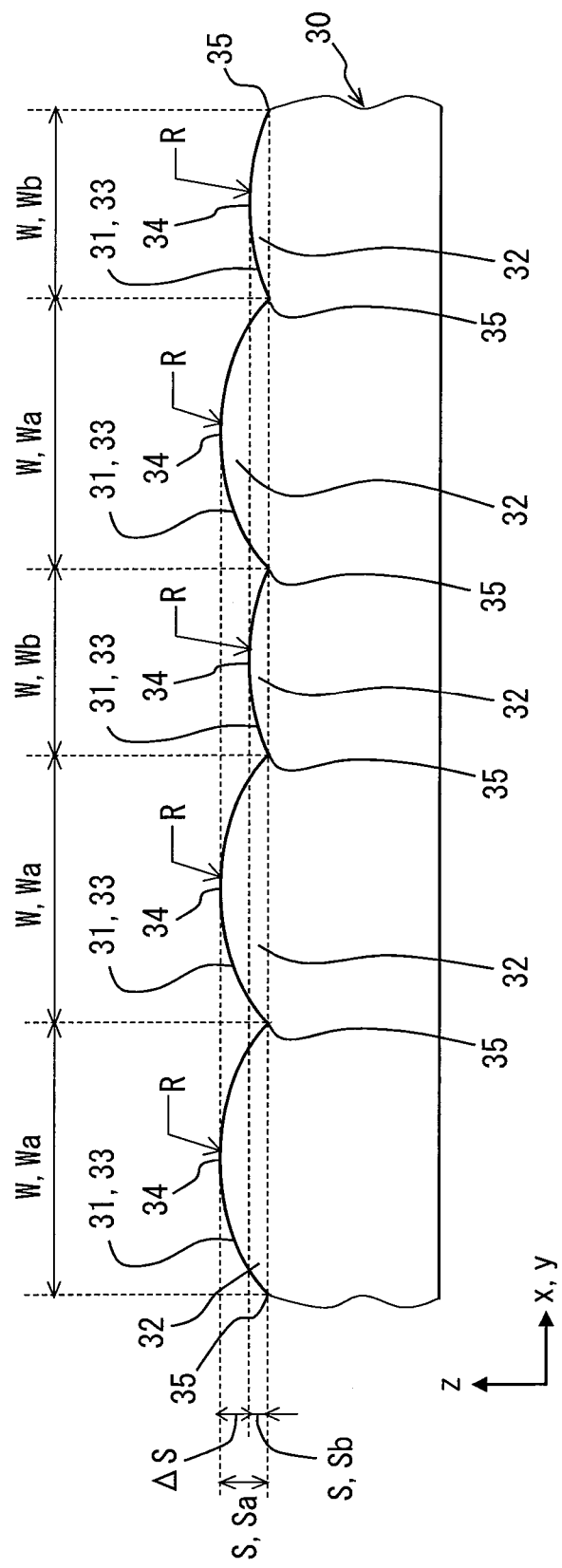
FIG. 26 is a schematic diagram partly showing a screen member as variants 5 and 7 applied to the first embodiment and being equivalent to FIG. 6.

As a variant 5 relating to the first to fourth embodiments, as shown in FIG. 26, as long as the element width W differs between adjoining optical elements 32, 2032, 3032, or 4032 in a part of the scanning surface 31 or 4031, the element width W may be set to an equal value for the adjoining elements in the remaining part of the scanning surface 31 or 4031. FIG. 26 shows the variant 5 applied to the first embodiment.

Figure 27:
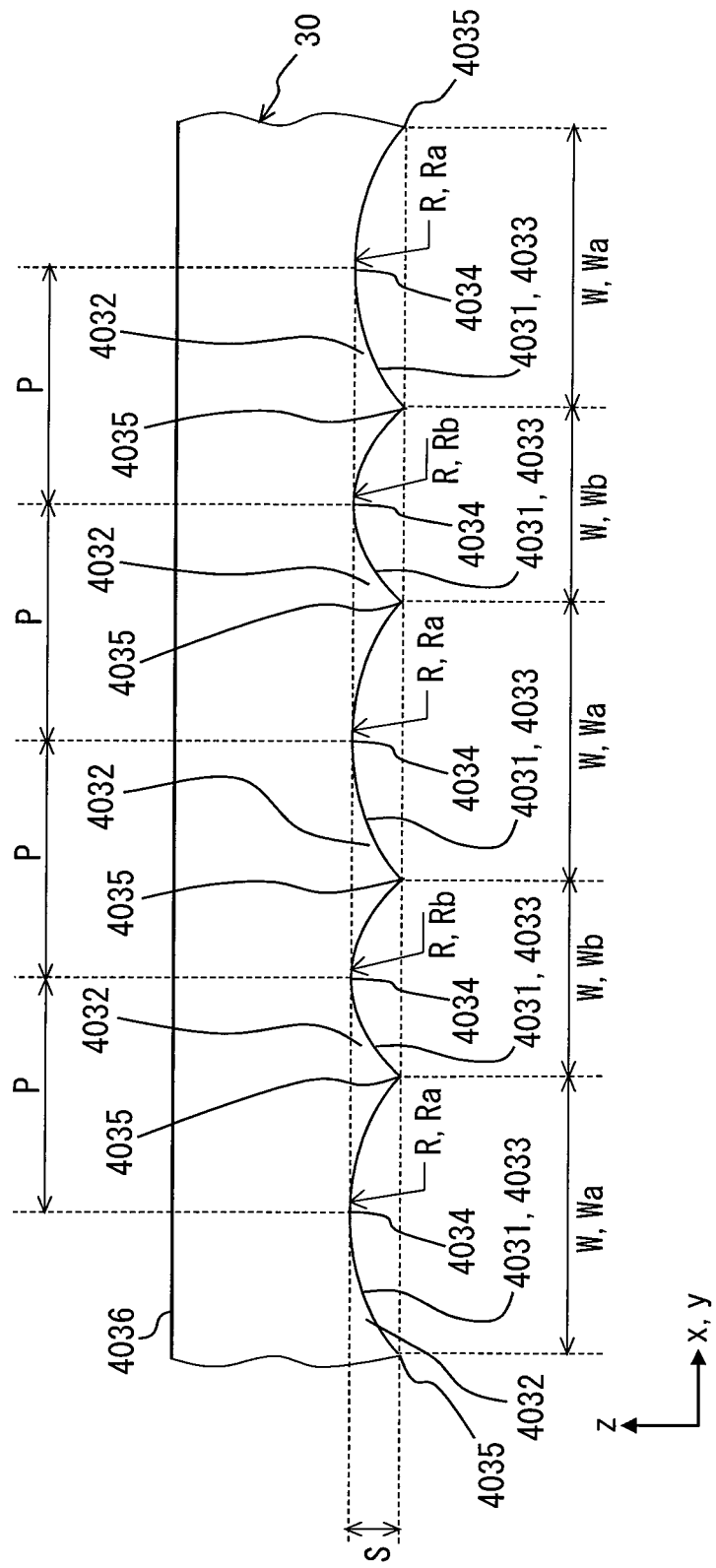
FIG. 27 is a schematic diagram partly showing a screen member as a variant 6 applied to the fourth embodiment and being equivalent to FIG. 18.

As a variant 6 relating to the fourth embodiment, the sag quantity S between the adjoining optical elements 4032 may be, conformably to the second embodiment, set to an equal value for the optical elements 4032 over the entire scanning surface 4031. FIG. 21 also shows the variant 6 applied to the fourth embodiment, and FIG. 27 shows the variant 6 applied to the fourth embodiment together with the variant 2.

As a variant 7 relating to the first to fourth embodiments, as shown in FIG. 26, while the sag quantity S between the adjoining optical elements 32, 2032, 3032, or 4032 may differ at a part of the scanning surface 31 or 4031, and the sag quantity S between the adjoining optical elements may be equal at a remaining part of the scanning surface 31 or 4031. FIG. 26 also shows the variant 7 applied to the first embodiment.

As a variant 8 relating to the first to fourth embodiment, as shown in FIG. 24, one optical element 32, 2032, 3032, or 4032 may have element widths W (Wa or Wb) that differ between the horizontal direction x and the vertical direction y. FIG. 24 also shows the variant 8 applied to the first embodiment.

As a variant 9 relating to the first to fourth embodiments, one optical element 32, 2032, 3032, or 4032 may have the radius of curvature R (Ra or Rb) which differs between the horizontal direction x and the vertical direction y.

As a variant 10 relating to the first to fourth embodiments, three or more element widths W may be designated. As a variant 11 relating to the first, third, and fourth embodiments, three or more sag quantities S may be designated. As a variant 12 relating to the first to fourth embodiments, the curved surfaces 33, 2033, 3033, or 4033 that transmit laser light projected onto the scanning surface 31 or 4031 so as to diffuse and emit the laser light may be formed as the faces of the optical elements 32, 2032, 3032, or 4032 serving as microlenses.

As a variant 13 relating to the first to fourth embodiments, a scanning mirror capable of being turned about two axes may be adopted as the MEMS 26 of the laser scanner 10 serving as a projector. As a variant 14 relating to the first to fourth embodiments, an element other than the windshield 90 may be adopted as a display member forming the projection surface 91 of the vehicle 1. For example, a combiner or the like that is bonded to an interior-side surface of the windshield 90 or formed separately from the windshield 90 may be adopted. Further, as a variant 15 relating to the first to fourth embodiments, the present disclosure may be applied to any of moving entities including boats, ships, and airplanes other than the vehicle 1.

The invention claimed is:

1. A head-up display device that projects a display image onto a projection surface of a moving entity and thus displays a virtual image of the display image so that the virtual image can be discerned inside the moving entity, comprising:
    a projector that projects laser light carrying the display image; and
    a screen member that has a plurality of optical elements arrayed in a form of a grating, and diffuses and introduces the laser light, which emanates from the projector and enters the optical elements, toward the projection surface, wherein
    the optical elements have curved surfaces, which are either convexly curved or concavely curved and take on a common curved form, as faces of the optical elements, and diffuse the laser light which is emitted to the projection surface from the curved surfaces; and
    the optical elements are configured so that an element width differs between the optical elements adjoining in at least one array direction in an array of the grating.

2. The head-up display device according to claim 1, wherein
    the optical elements are configured so that the element width in one of array directions in the array of the grating differs between the optical elements adjoining in the one of the array directions, and the element width in another one of the array directions in the array of the grating differs between the optical elements adjoining in the another one of the array directions.

3. The head-up display device according to claim 2, wherein
    the optical elements are configured so that a relationship of size of the element widths in the one of the array directions in the array of the grating is consistent with a relationship of size of the element widths in the another one of the array directions in the array of the grating.

4. The head-up display device according to claim 1, wherein
    the optical elements are configured so that a sag quantity from each of surface vertices of the curved surfaces to each of boundaries among the optical elements differs between the adjoining optical elements.

5. The head-up display device according to claim 1, wherein
    the optical elements are configured so that a sag quantity from each of surface vertices of the curved surfaces to each of boundaries among the optical elements are equal between the adjoining optical elements.

6. The head-up display device according to claim 1, wherein
    the optical elements are configured so that a radius of curvature of each of the curved surfaces differs between the adjoining optical elements.

7. The head-up display device according to claim 1, wherein
    the element width differs between the adjoining optical elements over an entire surface of the screen member on a side of the screen member on which the curved surfaces of the faces of the optical elements are formed.

* * * * *